(12) United States Patent
Perkins et al.

(10) Patent No.: US 11,029,448 B2
(45) Date of Patent: Jun. 8, 2021

(54) THIN FILMS AND A METHOD FOR MAKING THE SAME

(71) Applicant: Oregon State University, Corvallis, OR (US)

(72) Inventors: Cory K. Perkins, Corvallis, OR (US); Ryan Helmut Mansergh, Corvallis, OR (US); Juan Carlos Ramos, Corvallis, OR (US); Douglas A. Keszler, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 149 days.

(21) Appl. No.: 16/160,711

(22) Filed: Oct. 15, 2018

(65) Prior Publication Data

US 2019/0049629 A1 Feb. 14, 2019

Related U.S. Application Data

(63) Continuation-in-part of application No. PCT/US2017/028060, filed on Apr. 18, 2017.

(Continued)

(51) Int. Cl.
| | |
|---|---|
| *G02B 3/00* | (2006.01) |
| *G02B 7/00* | (2021.01) |
| *G02B 9/00* | (2006.01) |
| *G02B 11/00* | (2006.01) |
| *G02B 13/00* | (2006.01) |
| *G02B 15/00* | (2006.01) |

(Continued)

(52) U.S. Cl.
CPC .............. *G02B 1/113* (2013.01); *B32B 7/02* (2013.01); *B32B 9/005* (2013.01); *B32B 9/04* (2013.01); *C03C 17/25* (2013.01); *C04B 35/10* (2013.01); *C04B 35/111* (2013.01); *C04B 35/447* (2013.01); *C04B 35/62218* (2013.01); *C04B 35/63488* (2013.01); *C23C 18/1216* (2013.01); *C03C 2217/214* (2013.01); *C03C 2217/23* (2013.01); *C03C 2217/425* (2013.01); *C03C 2217/732* (2013.01); *C03C 2218/113* (2013.01); *C04B 2235/3218* (2013.01); *C04B 2235/75* (2013.01); *C04B 2235/963* (2013.01)

(58) Field of Classification Search
CPC .............. B32B 17/10174; C03C 17/23; C03C 2217/214; C23C 16/545; C23C 18/1216; G02B 1/113; C04B 35/10; C04B 2235/3218
USPC ........................................................ 359/642
See application file for complete search history.

(56) References Cited

U.S. PATENT DOCUMENTS

2007/0218265 A1 9/2007 Harris et al.

OTHER PUBLICATIONS

Khatibani et al., "Synthesis and characterization of amorphous aluminum oxide thin films prepared by spray pyrolysis: Effects of substrate temperature," *Journal of Non-Crystalline Solids* 363:121-133, 2013.

(Continued)

*Primary Examiner* — Mahidere S Sahle
(74) *Attorney, Agent, or Firm* — Klarquist Sparkman, LLP

(57) ABSTRACT

Disclosed herein are embodiments of a porous aluminum oxide thin film having a surface RMS roughness value of less than 1 nm. The thin film may also comprise phosphorus. The disclosed thin films may have a refractive index of from 1 to 2, such as from 1 to 1.5. Also disclosed are embodiments of as method for making the disclosed thin films, comprising forming an aqueous solution of the alumina precursor, a surfactant and optionally a phosphorus-containing precursor, and depositing the solution on a substrate.

19 Claims, 13 Drawing Sheets

Related U.S. Application Data

(60) Provisional application No. 62/324,240, filed on Apr. 18, 2016, provisional application No. 62/448,845, filed on Jan. 20, 2017.

(51) Int. Cl.

| | | |
|---|---|---|
| G02B 17/00 | (2006.01) | |
| G02B 25/00 | (2006.01) | |
| G02B 1/113 | (2015.01) | |
| B32B 7/02 | (2019.01) | |
| B32B 9/04 | (2006.01) | |
| C03C 17/25 | (2006.01) | |
| C04B 35/447 | (2006.01) | |
| C04B 35/634 | (2006.01) | |
| C23C 18/12 | (2006.01) | |
| C04B 35/111 | (2006.01) | |
| C04B 35/622 | (2006.01) | |
| B32B 9/00 | (2006.01) | |
| C04B 35/10 | (2006.01) | |

(56) References Cited

OTHER PUBLICATIONS

Meyers et al., "Solution-Processed Aluminum Oxide Phosphate Thin-Film Dielectrics," *Chemistry of Material* 16(16):4023-4029, 2007.

Perkins et al., "Low-index, smooth Al2O3 films by aqueous solution process," *Optical Materials Express* 7(1):273-280, 2017, published Dec. 22, 2016.

Wang et al., "Synthesis of the Hydroxide Cluster $[Al_{13}(\mu3\text{-}OH)_6(\mu\text{-}OH)_{18}(H_2O_{24})]^{15+}$ from an Aqueous Solution," *Inorganic Chemistry* 50(11):4683-4685, 2011.

Wang et al., "The impact of thickness and thermal annealing on refractive index for aluminum oxide thin films deposited by atomic layer deposition," *Nanoscale Research Letters* 10(46):1-6, 2015.

THIN FILMS AND A METHOD FOR MAKING THE SAME

CROSS REFERENCE TO RELATED APPLICATION

The present application is a continuation-in-part of International Application No. PCT/US2017/028060, filed on Apr. 18, 2017, which claims the benefit of the earlier filing dates of U.S. provisional application No. 62/324,240, filed on Apr. 18, 2016, and U.S. provisional application No. 62/448,845, filed on Jan. 20, 2017, all of which are incorporated herein by reference in their entirety.

ACKNOWLEDGMENT OF GOVERNMENT SUPPORT

This invention was made with government support under Award No. 1102637 awarded by the National Science Foundation. The government has certain rights in the invention.

FIELD

Disclosed herein is a method for making smooth porous alumina thin films from aqueous precursor and smooth thin films made by the method.

BACKGROUND

Preparing low-index of refraction thin films presents a significant goal to scientists and engineers, as they are useful in the production of anti-reflective coatings. In general, low-refractive index materials are of fundamental interest to the scientific community, as they are used to study the interactions between light and matter. The lowest naturally occurring refractive index material, $MgF_2$, has an index of refraction (n) of 1.37. The ideal anti-reflective coating would have a graded refractive index, approaching 1 at the surface adjacent to air and gradually increasing to the same refractive index as the substrate (e.g., glass at n=1.5). However, reliably producing a controllable refractive index across the thickness of a thin film on the scale of a few 10's or 100's of nanometers remains challenging.

Porous thin films are attractive materials to achieve this goal as they incorporate the lowest index of refraction material, air (n=1), lowering the overall index of refraction. However, high quality thin films typically are produced via vacuum-based techniques, but the nature of these techniques makes it difficult to produce high quality porous films. In lieu of vacuum techniques, solution processing is a low-energy alternative to thin-film deposition. To manufacture porous thin films by solution processing, sol-gel precursors have received much attention. However, these precursors foster nanoparticle formation due to their highly reactive ligands, typically yielding rough, non-continuous films.

SUMMARY

In view of the above, there remains a need in the art for improved methods of producing anti-reflective coatings with controllable refractive indices. Disclosed herein are embodiments of a porous aluminum oxide thin film that address this need. The porous aluminum oxide thin film may comprise a surface having a root mean square (RMS) roughness value of from greater than zero to 1 nm, such as from 0.1 nm to 0.7 nm, from 0.3 nm to 0.6 nm, or from 0.4 nm to 0.5 nm. Additionally, or alternatively, the film may have a refractive index of from 1 to 2, such as from 1 to 1.35, or from 1 to 1.2. Some embodiments of the film have a film thickness of from greater than zero to 500 nm, such as from greater than zero to 250 nm, or from greater than zero to 100 nm. And/or the film may comprise pores having an average diameter of from greater than zero to 20 nm.

In certain embodiments, the film further comprises phosphorus. The film may have a P:Al ratio of from greater than zero:1 to 3:1, such as from greater than zero:1 to 2:1, from 0.4:1 to 1.8:1, or from 0.4:1 to 1:1. In certain embodiments, the P:Al ratio is 0.6:1 or 1:1. And in some examples, the film has a general formula $Al_2O_{3-3a}(PO_4)_{2a}$ where a is from 0.25 to 1.

The film may be a layered film, and for some examples the layered film comprises from 2 to 10 layers, such as from 3 to 10 layers. In some embodiments, each layer independently has a refractive index of from 1 to 1.5. The layered film may comprise a composition gradient from a first composition to a second composition. The second composition may have a P:Al ratio that is greater than a P:Al ratio of the first composition. Additionally, or alternatively, the layered film may comprise one or more layers having a first refractive index and one or more layers having a second refractive index that is greater than the first refractive index. And/or the layered film may comprise a refractive index gradient from the first refractive index to the second refractive index.

Also disclosed herein is a method for making a porous aluminum oxide film that has a surface having an RMS roughness value of from greater than zero to 1 nm. In some embodiments, the method comprises forming a first aqueous solution comprising a first alumina precursor and a first surfactant; depositing the first aqueous solution on a substrate to form a first film; and exposing the substrate to an annealing temperature to form the porous aluminum oxide thin film. The first alumina precursor may be aluminum nitrate, aluminum chloride, $Al_{13}(OH)_{24}(NO_3)_{15}$, or a combination thereof, and preferably is $Al_{13}(OH)_{24}(NO_3)_{15}$. The nonionic surfactant may be a block copolymer, and may comprise alkylene oxide blocks, such as ethylene oxide and propylene oxide copolymers. In some examples, the block copolymer has a formula

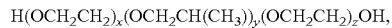

$$H(OCH_2CH_2)_x(OCH_2CH(CH_3))_y(OCH_2CH_2)_zOH,$$

wherein x and z independently are from 10 to 150, and y is from 10 to 100. In some examples, x and z are the same and are from 12 to 141, and y is from 10 to 56. And in certain embodiments, x and z are each 101, and y is 56.

A person of ordinary skill in the art will understand that the support may comprise any suitable material and/or shape. For certain disclosed embodiments, the substrate may comprise silicon; glass; metal; ceramic; an optical crystal; a laser crystal or a polymeric substrate, including polyacrylates or polyimides such as Kapton® from DuPont. In some embodiments, the substrate is glass. Depositing the first solution on the substrate may comprise depositing the first solution by any suitable method, such as spin-coating, spray coating, ink-jet printing, mist deposition, dye-slot coating, or dip coating, preferably spin-coating. The deposited film or films may be annealed, such as at an annealing temperature of from 350° C. to 1,000° C., such as from 450° C. to 600° C.

Embodiments of the disclosed method may further comprise exposing the first film to a first temperature of from 50° C. to 250° C. prior to exposing the substrate to the annealing temperature. The first film may be exposed to the first temperature for from greater than zero to 5 minutes. In other embodiments, the method comprises selecting a concentration of the first alumina precursor to produce a porous thin film having a desired thickness after annealing. The concentration of the first alumina precursor may be from greater than zero to 1 M. And/or an amount of the surfactant may be from greater than zero to 20% w/v (weight of alumina precursor to volume of surfactant).

In some embodiments, the first aqueous solution comprises the first alumina precursor, the first surfactant, and a first phosphorus-containing precursor. The first phosphorus-containing precursor may be $H_3PO_4$. The amount of the first phosphorus-containing precursor may be selected to produce a desired P:Al ratio in the porous aluminum oxide thin film, such as a P:Al ratio of from greater than zero:1 to 2:1, or from 0.5:1 to 1.5:1, and in some examples, the P:Al ratio is about 1:1 or 0.6:1.

Certain disclosed embodiments comprise depositing a second aqueous solution comprising a second alumina precursor, a second surfactant, and optionally a second phosphorus-containing precursor, on the first film prior to exposing the substrate to the annealing temperature, to make a thin film comprising a first layer and a second layer. A P:Al ratio for the second layer may be selected to be different to a P:Al ratio of the first layer. The method may further comprise depositing a third aqueous solution comprising a third alumina precursor, a third surfactant, and optionally a third phosphorus-containing precursor, on the second layer prior to exposing the substrate to the annealing temperature, to make a third layer, the third layer having the same or a different P:Al ratio to that of the first and/or second layer. The P:Al ratios of the first, second and third layers may be selected to form a compositional gradient across the layers, and/or a refractive index gradient across the layers.

The foregoing and other objects, features, and advantages of the invention will become more apparent from the following detailed description, which proceeds with reference to the accompanying figures.

DETAILED DESCRIPTION

I. Terms

Figure 1:
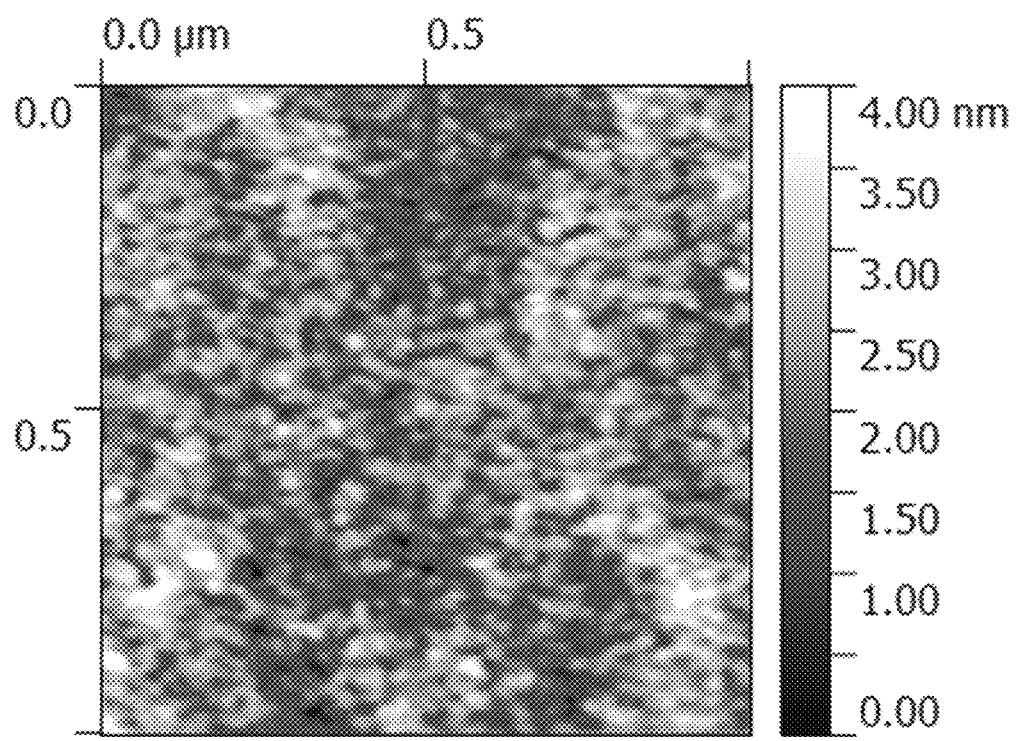
FIG. 1 is an atomic force microscopy (AFM) micrograph of a 10% PF127 film after annealing to 500° C., illustrating that the surface of the porous film was substantially smooth.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

"Porous," such as in a porous layer or porous film, refers to a layer or film containing or defining pores, which may or may not extend completely through the material. The skeletal portion of the porous material may be referred to as the matrix, and a pore is a space in the material that is not occupied by the material. A pore may be an opening in a surface of the material (i.e. not completely surrounded by the matrix), or a pore may be contained within the material. Porous materials exhibit a lower density than non-porous materials of the same composition. Porous materials can have a pore size, or average diameter, of about 1 micron or less, preferably 100 nm or less, more preferably 50 nm or less, and in certain disclosed embodiments, 20 nm or less.

"Soft baking" or "soft baked" refers to heating a material, such as a film or layer, prior to annealing, and at a temperature below an annealing temperature of the film or layer and for a time period of from greater than zero to the time required to achieve a desired result. In some embodiments, the "soft baking," or initial heating, may comprise exposing the material to a temperature of from 50° C. to 250° C., such as from 100° C. to 200° C., and/or may proceed for a time period of from greater than zero to the time required to achieve the desired result, such as, from greater than zero to at least 5 minutes, or from 1 minute to 2 minutes.

"Thin," as used herein with respect to a thin film or thin layer, refers to a film or layer typically having a film thickness or layer thickness of from greater than zero to 1 micron, such as from greater than zero to 500 nm, from greater than zero to 250 nm, or from greater than zero to 100 nm.

II. Description

A. Method for Making a Thin Film

Disclosed herein are embodiments of a method for making an alumina thin film from aqueous precursors. The disclosed thin films may be useful for many applications, such as in an optical interconnect, a waveguide, solar applications including photovoltaics, low-energy or high efficient thermal windows, or antireflective coatings on lenses, such as glasses. The method comprises dissolving a suitable precursor or precursors in a solvent to make an aqueous solution, depositing the solution on a substrate, and then heating the substrate and solution to produce the thin film. The solvent may be water, or a water/alcohol mixture, where the alcohol is any alcohol suitable for dissolving the precursor(s) and/or making the thin film. In some embodiments, the alcohol is a $C_{1-6}$alcohol, and in some embodiments, the alcohol is methanol, ethanol, propanol, isopropanol, n-butanol, 2-butanol, isobutanol or a combination thereof. The water/alcohol ratio may be from 1:99 to 100:0 (i.e. no alcohol present), but in some embodiments, the solvent comprises at least 50% water, such as at least 60%, at least 70%, at least 80%, at least 90%, at least 95% or at least 97% water. And in certain embodiments, the solvent is substantially water, such as at least 99%, at least 99.2%, at least 99.5%, at least 99.7%, at least 99.9%, or 100% water. The substrate can be any substrate on which a thin film can be formed, such as a silicon; glass, such as glass lenses and windows; metal; optical crystals, including non-linear optical crystals; laser crystals; or ceramic substrates. In some embodiments, the substrate is a silicon substrate, such as a silicon wafer. In other embodiments, the substrate is glass, such as a silicate glass, i.e. a glass comprising silicon dioxide.

Suitable precursors include any water or water/alcohol soluble precursors that can be used to produce a desired alumina thin film. The soluble alumina precursor may be an aluminum compound, such as an aluminum complex or salt. In some embodiments, the aluminum compound is or comprises $Al_{13}(OH)_{24}(NO_3)_{15}$ (flat-$Al_{13}$); aluminum nitrate; aluminum nitrohydrate; aluminum acetate; aluminum sulfate; aluminum halide such as aluminum chloride, aluminum bromide, or aluminum iodide; aluminum chlorohydrate; or a combination thereof. The amount of alumina precursor is selected to produce a concentration of $Al^{3+}$ in the aqueous solution suitable to facilitate production of a thin film with desired properties, such as a desired thickness, a desired refractive index, and/or RMS surface roughness. In some embodiments, the amount of alumina precursor is selected to produce an $Al^{3+}$ concentration in the solution of from greater than zero to 1 M or more, such as from 0.1 M to 0.9 M, from 0.2 M to 0.8 M or from 0.4 M to 0.8 M.

Agitation may be used to facilitate forming the solution comprising desired precursors. The agitation may be provided by any suitable technique, such as stirring, shaking, sonication, or a combination thereof. Additionally, or alternatively, a precursor/solvent mixture may be heated to aid formation of the solution. The mixture may be heated at a temperature suitable to form the solution, such as from 25° C. to reflux, typically 100° C. or more, such as from 30° C. to 100° C., from 50° C. to 90° C. or from 70° C. to 90° C. The heating and/or agitation may proceed for a time period suitable to facilitate formation of the solution, such as from 1 hour or less to 48 hours or more, from 6 hours to 36 hours, from 12 hours to 30 hours or from 18 hours to 24 hours. In some embodiments, a precursor/solvent mixture is heated and/or agitated in a sealed container, for example, to reduce evaporation.

The thin film may also comprise phosphorus. Phosphorus-containing thin films may be produced by forming compositions comprising a phosphorus-containing precursor, such as a phosphate- ($PO_4^{3-}$) containing precursor. Exemplary phosphorus-containing precursors include, but are not limited to, phosphoric acid ($H_3PO_4$), and phosphoric acid salts. The salt of the phosphoric acid may be any suitable salt including metal and non-metal salts. In some embodiments, the phosphoric acid salt is selected such that the cation is substantially removed during the heating and/or annealing processes, and thus does not contribute to the final composition. Such phosphoric acid salts include, but are not limited to, ammonium and alkyl ammonium phosphoric acid salts, such as $NH_4H_2PO_4$ and $(NH_4)_2HPO_4$. In other embodiments, the phosphoric acid salt may be selected to provide a metal ion that is desired to be included in the composition. Such phosphoric acid salts include, but are not limited to, aluminum phosphate, sodium phosphate, or potassium phosphate.

In some embodiments, phosphoric acid is added as a phosphorus-containing precursor to the aqueous solution. The amount of the phosphorus-containing precursor may be selected to produce a desired P:Al ratio in the thin film. The P:Al ratio may be from 0:1 (i.e., no P present) to 3:1 or more, such as from greater than zero:1 to 3:1, from greater than zero:1 to 2.5:1, from greater than zero:1 to 2:1, from 0.2:1 to 2:1, from 0.4:1 to 1.8:1, or from 0.5:1 to 1.5:1. In some embodiments, the P:Al ratio was from 0.2:1 to 1:1, such as from 0.4:1 to 1:1, or from 0.6:1 to 1:1. And in certain disclosed embodiments, the P:Al ratio was 0:1, 0.6:1, 1:1, 1.5:1 or 2:1, preferably 0.6:1 or 1:1. The amount of the phosphorus-containing precursor is also a factor in determining film thickness, and thus, the amount may also be selected to help produce a desired thin film thickness.

The precursors may also include a surfactant. The surfactant may be any surfactant suitable to facilitate producing a porous thin film. Exemplary surfactants include, but are not limited to, nonionic surfactants, such as Triton X-100 or nonionic block copolymers. In certain disclosed embodiments, the nonionic surfactant is a block copolymer comprising alkylene oxides, such as ethylene oxide, propylene oxide, butylene oxide, or a combination thereof. The surfactant may be a block copolymer comprising ethylene oxide and propylene oxide, and may have a formula

where x and z independently are from 10 to 150 or more, and y is from 10 to 100 or more. x and z may be the same, and may be from 12 to 141, such as 12, 64, 80, 101 or 141, and y is from 10 to 56, such as 20, 27, 37, 44 or 56. In some embodiments, each of x and z are 12 and y is 20, and the block copolymer has a molecular weight of from 2090 to 2360, such as Pluronic® L44NF (available from BASF); each of x and z are 80 and y is 27, and the block copolymer has a molecular weight of from 7680 to 9510, such as Pluronic® F68NF (available from BASF); each of x and z are 64 and y is 37, and the block copolymer has a molecular weight of from 6840 to 8830, such as Pluronic® L87NF (available from BASF); each of x and z are 141 and y is 44, and the block copolymer has a molecular weight of from 12700 to 17400, such as Pluronic® F108NF (available from BASF); or each of x and z are 101 and y is 56, and the block copolymer has a molecular weight of from 9840 to 14600 and/or an average molecular weight 12.6 kDa, such as Pluronic® F127NF (PF127) (available from BASF). In some embodiments, the amount of surfactant used in the aqueous solution is from greater than zero to 20% w/v or more surfactant, such as from 1% to 20% w/v, from 3% to 15% w/v, or from 5% to 10% w/v surfactant. In certain disclosed embodiments, 10% w/v surfactant was used. The amount of the surfactant may be selected to produce desired physical and/or optical properties, such as a desired refractive index, in the thin film. For example, in certain disclosed embodiments, 5% surfactant produced in an alumina film having a refractive index of 1.32, whereas 10% surfactant produced an alumina film having a refractive index of 1.26, compared to an alumina film produced with no surfactant that had a refractive index of 1.54.

The thin film may be deposited on the substrate by any suitable technique. Suitable techniques include, but are not limited to, spin-coating, spray coating, ink-jet printing, mist deposition, dye-slot coating, or dip coating.

After deposition, the thin film optionally may be initially exposed to a temperature below the film's annealing temperature, for example, to evaporate some or substantially all of any residual solvent. This initial heating, or "soft baking," may be comprise exposing the film to a temperature of from 50° C. to 250° C., such as from 100° C. to 200° C., and may proceed for a time period of from greater than zero to the time required to achieve the desired result, such as, from greater than zero to at least 5 minutes, or from 1 minute to 2 minutes. The film may be exposed to a first temperature for a first period of time, then exposed to a second temperature, typically higher than the first temperature, for a second period of time. In some embodiments, the film is exposed to a temperature of from 80° C. to 120° C. for a time period of from greater than zero to 3 minutes, such as from 1 to 2 minutes, then exposed at a temperature of from 150° C. to 250° C., such as from 180° C. to 220° C. for a time period of from greater than zero to 3 minutes, such as from 1 to 2 minutes.

The thin film is exposed to a temperature suitable to anneal the film and produce a film having one or more desired properties, such as refractive index, surface smoothness and/or film thickness. The annealing temperature may be selected to ensure that substantially all of the residual components from the precursors, such as nitrates, are removed. In embodiments where the thin film is prepared in the presence of a surfactant, the annealing temperature may be selected to be sufficient to substantially remove the surfactant during the annealing process. Additionally, or alternatively, the annealing temperature may be selected to be a temperature below the crystallization temperature of the film. Without being bound to a particular theory, as the annealing temperature approaches the crystallization temperature of the film, the film may start to crystallize and/or the pores may start to collapse. As the film starts to crystallize, the refractive index and/or surface RMS roughness may start to increase. Therefore, the annealing temperature may be selected to produce an amorphous porous thin film (i.e. not crystalline or semi-crystalline film) and/or to substantially prevent crystallization and or collapse of the pores.

To anneal, the film may be exposed to an annealing temperature of from 350° C. to 1,000° C. or more, such as from 400° C. to 1,000° C., from 450° C. to 900° C., from 450° C. to 800° C., from 450° C. to 700° C., from 450° C. to 600° C. or from 500° C. to 600° C., and in certain disclosed embodiments, the film was annealed by exposing the film to a temperature of about 500° C. The film may be exposed to the annealing temperature for a time period sufficient to anneal the film. The time period may be from greater than one minute to 12 hours or more, such as from 5 minutes to 6 hours, from 15 minutes to 4 hours, from 30 minutes to 2 hours, or from 45 minutes to 90 minutes. In certain disclosed embodiments, the film was exposed to the annealing temperature for 1 hour.

B. Embodiments of a Thin Film Made by the Disclosed Method

Figure 2:
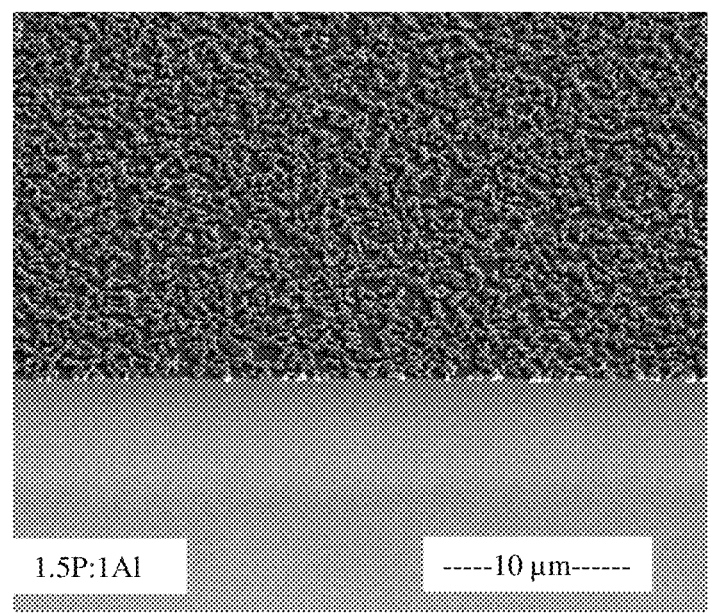
FIG. 2 is an SEM micrograph of a 1.5P:1Al film after annealing at 500° C. illustrating the non-continuous nature of the film after annealing.
Figure 3:
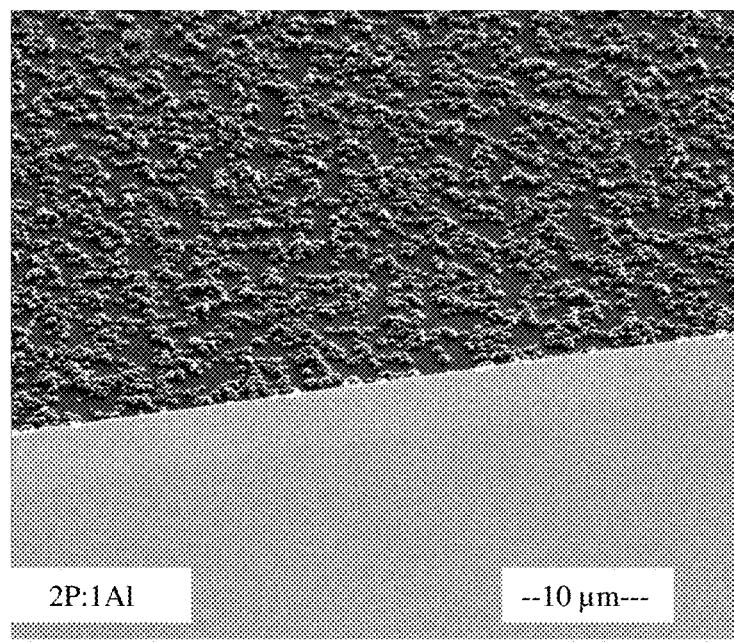
FIG. 3 is an SEM micrograph of a 2P:1Al film after annealing at 500° C. illustrating the non-continuous nature of the film after annealing.

Certain embodiments of a thin film made by the disclosed method may be porous. In some embodiments, the pores in a porous thin film are internal pores, that is, the surface of the film is substantially free of pores and/or the pores do not extend to the surface of the film. Additionally, and/or alternatively, a porous thin film may comprise a crust or surface layer that provides the desired smooth surface. Typically, the crust or surface layer has a thickness of from greater than zero to 5 nm, such as from greater than zero to 2 nm, or from greater than zero to less than 2 nm. FIG. 1 is an AFM image of an exemplary porous thin film made by the disclosed method. As can be seen in FIG. 1, the film surface is substantially smooth, with a root mean square (RMS) value of 0.5 nm. In contrast, FIGS. 2 and 3 show films where the some pores have started to collapse and the film's surface is no longer continuous and smooth. In some embodiments, the porous film comprises pores having an average diameter of from greater than zero to 20 nm, such as from greater than zero to 15 nm, from greater than zero to 14 nm, from greater than zero to 13 nm, from greater than zero to 12 nm, from greater than zero to 11 nm, or from greater than zero to 10 nm.

In alternative embodiments, the thin film is a dense film, i.e. a substantially non-porous film. The dense or non-porous film may comprise aluminum and phosphorus as described herein, but typically is made without using a surfactant.

In some embodiments, a thin film comprising phosphorus is an aluminum oxide phosphate film. The film may have a general formula $Al_2O_{3-3a}(PO_4)_{2a}$ where a is from 0.25 to 1, and/or a general formula $Al_2O_{3-b}P_2O_5$, where b is from 0.25 to 2. In any embodiments, a thin film made by the disclosed method has a substantially smooth surface, such as a surface having a RMS roughness value of from greater than zero to 1 nm, such as from greater than zero to less than 1 nm, from greater than zero to 0.75 nm, from 0.1 nm to 0.7 nm, from 0.2 nm to 0.6 nm, from 0.3 nm to 0.6 nm, from 0.4 nm to 0.6 nm, or from 0.4 nm to 0.5 nm. The RMS roughness value may be determined by AFM measurements acquired over a 1×1 μm² area. Such smooth surfaces may be advantageous, for example, for enhancing anti-reflective properties of the film, and/or providing an enhanced interface with a second film or layer that is deposited on top of the thin film. In some embodiments, the thin film is amorphous, and not crystalline or semi-crystalline. Without being bound to a particular theory, the onset of crystallization in the film may result in the surface roughness and/or refractive index increasing, and additionally, or alternatively, may cause some of the pores to collapse.

Alternatively, or additionally, a thin film made by embodiments of the disclosed method may have a refractive index of from 1 to 2, such as from 1 to 1.5, from 1 to 1.45, from 1 to 1.4, from 1 to 1.35, from 1 to 1.3, from 1 to 1.25, from 1 to 1.2, from 1 to 1.18, from 1 to 1.16, or from 1 to 1.15. In certain embodiments, a non-porous film may have a refractive index of from 1 to 1.5, from 1 to 1.45, from 1 to 1.4, from 1 to 1.39, from 1 to 1.38, from 1 to 1.37, from 1 to 1.36, from 1 to 1.35, from 1 to 1.34, from 1 to 1.33, from 1 to 1.32, from 1 to 1.31, or from 1 to 1.30. In some embodiments, the refractive index is measured at a particular wavelength, such as 550 nm, for comparative purposes.

The thickness of the film after annealing can be selected by selecting the concentration of the precursors, such as the concentration of the alumina precursor and/or the concentration of the phosphorus-containing precursor, if present. In some embodiments, film thicknesses can be directly selected for the preferred application by controlling the concentration of the alumina precursor. A rough approximation of film thickness can be estimated by Equation 1, where t is the thickness (nm) and c is the concentration of $Al^{3+}$ (M).

$$t = [145.8cM^{-1}] \text{ nm} \qquad \text{Equation 1}$$

Alternatively, in embodiments where the film comprises phosphorus, film thickness can be selected by controlling the amount of phosphorus-containing precursor used. An estimate of the resulting thickness can be obtained from Equation 2, where t is the thickness (nm), c is the concentration of $PO_4^{3-}$ (M), and A is the thickness of an amorphous alumina film made using the same concentration of the alumina precursor. For example, an amorphous alumina (a-$Al_2O_3$) film made from an alumina precursor having a concentration of 0.4 M produced a film with a thickness of 17.3 nm.

$$t = [86.1cM^{-1} + A] \text{ nm} \qquad \text{Equation 2}$$

The film thickness after annealing may be as selected for a particular application, such as from greater than zero to 500 nm or more, such as from greater than zero to 400 nm, from greater than zero to 350 nm, from greater than zero to 300 nm, from greater than zero to 250 nm, from greater than zero to 200 nm, from greater than zero to 150 nm, from greater than zero to 100 nm, or from greater than zero to 50 nm.

In any embodiments, the film may reduce the reflection of the substrate on which it is located. In some embodiments, the film has a reflection of from greater than zero to 6%, such as from 0.1% to 3%, or from 0.1% to 1%, and in certain embodiments, a film on a borosilicate glass has a reflection of 0.5%, compared to a reflection for uncoated borosilicate glass of about 8%. The reflection value can be varied by varying the thickness of the film. The reflection value is measured using standard equipment. Transmission and reflection spectra from 250-1000 nm are measured at near-normal incidence by using a double-grating spectrometer with a broadband Xe source and a Si diode detector.

C. A Layered Film Comprising Multiple Thin Films

A layered film comprises multiple thin films, with at least one, some, or all of the films having compositions and/or physical properties of films as disclosed herein, with each thin film being a layer in the layered film. The layered film may comprise 2, 3, 4, 5, 6, 7, 8, 9, 10 or more layers. Sequential and/or non-sequential layers may have the same or different compositions, such as P:Al ratios, and/or physical and/or optical properties, such as refractive index. The layered film may comprise a composition change and/or gradient across the layers from the substrate to the surface layer, for example, there may be an increasing or decreasing amount of phosphorus in the layers from the substrate to the surface layer. In some embodiments, the different layers are selected to provide a change and/or gradient of physical and/or optical properties. As used herein with respect to composition or a physical and/or optical property, a gradient across the layers refers to a change from a layer having a first composition and/or property to a second layer having a second composition and/or property where there are one or more intermediate layers, such as 2, 3, 4, 5, 6, 7, 8 or more intermediate layers, having intermediate compositions and/or properties that together with the first and second layers, form a gradual change from the first composition and/or property to the second composition and/or property. The layers may be selected to provide an increasing or decreasing change or gradient of refractive indices across the layers from the substrate to the surface layer. In some embodiments, the layered film comprises multiple compositional and/or property changes and/or gradients across the layers from the substrate to the surface. For example, the layers may be selected to provide a first change and/or gradient that increases the refractive indices of the layers, and then a second change and/or gradient that decreases the refractive indices of the layers, or vice versa. In some embodiments, layers are selected to provide a layered film having an inner layer or layers having a first refractive index, with an outer layer or layers having a second refractive index higher that the first refractive index. Such an arrangement of layers may be useful for an optical band-pass filter or waveguide.

A layered film may be made by depositing a first layer on the substrate and heating this layer at a first temperature below an annealing temperature for a time suitable to form a non-annealed layer, as described herein. A second layer can then be deposited on the surface of the first layer. The second layer may then be heated at a second temperature below an annealing temperature, the second temperature being the same or different to the first temperature. If the second layer is the desired outer or surface layer, heating at the second temperature optionally may be omitted. Additional layers can then be deposited by repeating the deposition and heating processes until all the desired layers have been deposited. Once the desired outer or surface layer is deposited, the layered film may be annealed at an annealing temperature, as described herein. The outer or surface layer optionally may be heated at a temperature below the annealing temperature prior to annealing.

III. Examples

Example 1

Method for Making a Nanoporous Alumina Thin Film from Aqueous Precursors

A. Materials and Methods

A nanoporous alumina thin film was prepared from an alumina precursor and a surfactant. The alumina precursor was flat-$Al_{13}$, $Al_{13}(OH)_{24}(NO_3)_{15}$, and the surfactant used was the nonionic block copolymer Pluronic® F-127 (PF127). The thin film was prepared by spin-coating. For direct comparison, an alumina control film, made without the addition of PF127, was spun with the same conditions as the surfactant loaded films. The flat-$Al_{13}$ used as the solution precursor for the thin films was synthesized according to the method disclosed by Wang et al. (*Inorg. Chem.* 2011, 50, 4683-4685, which is incorporated herein by reference in its entirety). Briefly, $Al(OH)_3$ (Alfa) was dissolved in 1.15 mole equivalents of aqueous $HNO_3$ (Fisher, ACS 70%). $Al(OH)_3$ dissolution was accomplished by stirring under moderate heat (80-90° C.) in a water bath for 24 hours to form a solution of $Al_{13}(OH)_{24}(NO_3)_{15}$.

Solutions were prepared starting with a stock solution with an aluminum concentration of 0.8 M. PF127 (Aldrich) was used without further purification, and was dissolved directly in the precursor solution in concentrations of 1, 5, 10, and 20% w/v. Solutions were characterized by dynamic light scattering (DLS) to determine the presence and size of micelles formed via the addition of PF127 using a Brookhaven Instruments Corporation ZetaPALS.

The films were spun-coat at 3000 rpm for 30 seconds on highly doped p-Si for the TEM experiment. Substrates were cleaned and made hydrophilic by an oxygen plasma treatment using a Plasma Etch PE-50. Films deposited on doubled-side polished p-Si with a low-dopant concentration were used for FTIR analysis. Directly after deposition, the films were heated at 100° C. for 1 minute and then at 200° C. for 1 minute. To remove the surfactant, the films were annealed to 500° C. in a Neytech Qex furnace. As a control, a single coat of the alumina precursor (without surfactant) was deposited and treated under the same conditions as the films containing PF127. Spectroscopic ellipsometry measurements were collected on a J. A. Woollam M-2000 instrument. Single-point measurements were used to determine the film thicknesses, which were modeled using the CompleteEASE software package. The Sellmeier model (W. Sellmeier, Zur Erklärung der abnormen Farbfolge im Spektrum einiger Substanzen, *Annalen der Physik and Chemie* 219, 272-282 (1871)) was employed to determine the thicknesses and optical constants of the soft baked and annealed thin films. Three equations were developed for porous films made without using a surfactant (Equation 3), and for porous films made using 5% or 10% PF127 (Equations 4 and 5, respectively).

$$n = \left(1 + \frac{1.362\lambda^2}{\lambda^2 - 0.0877^2}\right)^{\frac{1}{2}} \quad \text{Equation 3}$$

$$n = \left(1 + \frac{0.728\lambda^2}{\lambda^2 - 0.119^2}\right)^{\frac{1}{2}} \quad \text{Equation 4}$$

$$n = \left(1 + \frac{0.553\lambda^2}{\lambda^2 - 0.122^2}\right)^{\frac{1}{2}} \quad \text{Equation 5}$$

With respect to Equations 3, 4 and 5, n is the refractive index and λ is wavelength.

FTIR spectroscopy studies were carried out using a nitrogen-purged home-built ALD reactor with a Thermo Nicolet 6700 infrared spectrometer, equipped with a liquid nitrogen-cooled broadband mercury cadmium telluride (MCT-B) detector. A single-pass transmission at Brewster incidence (about 74°) was used to minimize the substrate phonon absorption in the low frequency region (<1000 $cm^{-1}$) and increase sensitivity of all components (parallel and perpendicular to the surface) of the surface species. The IR spectra were recorded in the spectral range of 400-4000 $cm^{-1}$, with a 4 $cm^{-1}$ resolution. XRD spectra were collected on a Rigaku Ultima IV multipurpose X-ray diffraction system, with Cu Kα radiation.

Temperature programmed desorption (TPD) was used to determine the optimal temperature to anneal the samples after to fully remove the surfactant. TPD was performed on a Hiden Analytical TPD workstation with a quadrupole mass analyzer (3F PIC) to analyze gas-phase products evolved from the thin films upon heating. The measurement was performed under ultra-high vacuum, with the base pressure for the instrument being less than $5\times10^{-9}$ Torr. Spectra were obtained using electron impact ionization with 70 eV ionization potential and 20-µA emission current. The thin film samples on 2.5×2.5 cm$^2$ samples were cleaved into 1×1 cm$^2$ for the TPD analysis.

The TEM imaging was performed using an FEI Titan 80-200 TEM/STEM transmission electron microscope at 200 kV. A coating of carbon was deposited, followed by a layer of thermally evaporated chromium. After in situ addition of a final protective layer of platinum, thin cross sections of the porous alumina films were selectively etched out by a gallium focused ion beam using an FBI Quanta 3D SEM. The cross-sectional TEM sample was welded to a copper TEM grid and thinned to approximately 100 nm using the ion beam.

Atomic force microscope (AFM) measurements were carried out using an Asylum Research MFP-3D atomic force microscope and images were acquired over 1×1 µm$^2$ areas.

TABLE 1

Statistical quantities from the AFM

| | |
|---|---|
| Average value | 2.1867 nm |
| Minimum | 0.0000 nm |
| Maximum | 5.3796 nm |
| Median | 2.1843 nm |
| Ra | 0.4292 nm |
| RMS | 0.5435 nm |
| RMS (grain-wise) | 0.5435 nm |

B. Discussion

The initial surfactant concentrations were based on the solubility limit of PF127 in water, working to lower concentrations to determine the effect on film properties. A solution with 20% w/v PF127 proved to be too viscous, leading to non-uniform films upon spin coating and providing the upper limit for surfactant concentration. Dynamic light scattering (DLS) showed the presence of micelles in the 5 and 10% solutions, and showed that micelle sizes were independent of surfactant concentration. The solutions had micelles with hydrodynamic radii of 33.5±0.4 and 33.3±0.3 nm for the 5% and 10% solutions, respectively. The particle size for the 1% solution, however, was below the detection limit of the instrument, and thus was not used further in this study.

Figure 4:
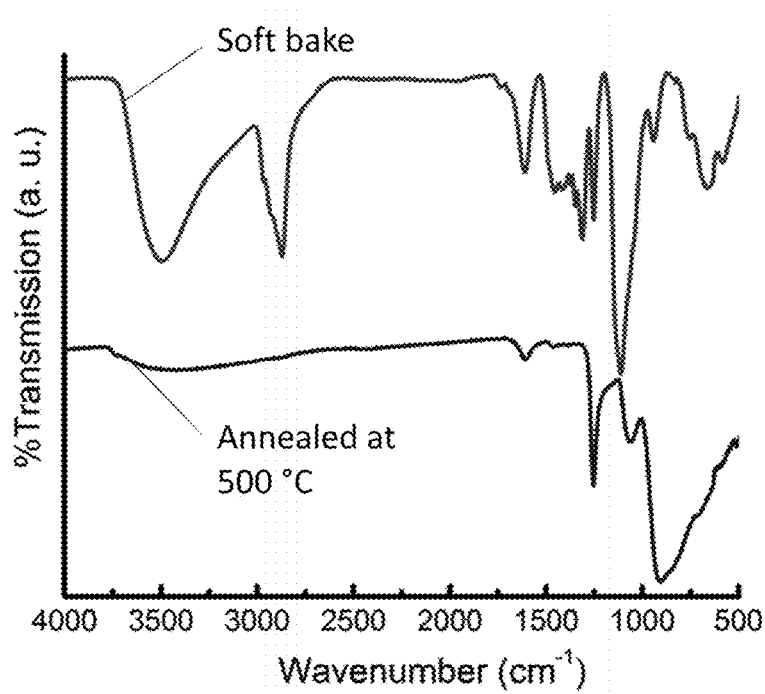
FIG. 4 is a graph of percentage transmission versus wavenumber, illustrating the Fourier transform infrared (FTIR) spectrums of the $Al_2O_3$ with Pluronic® F127 surfactant (PF127) directly after soft baking (top line) and the film after annealing at 500° C. (bottom line).
Figure 5:
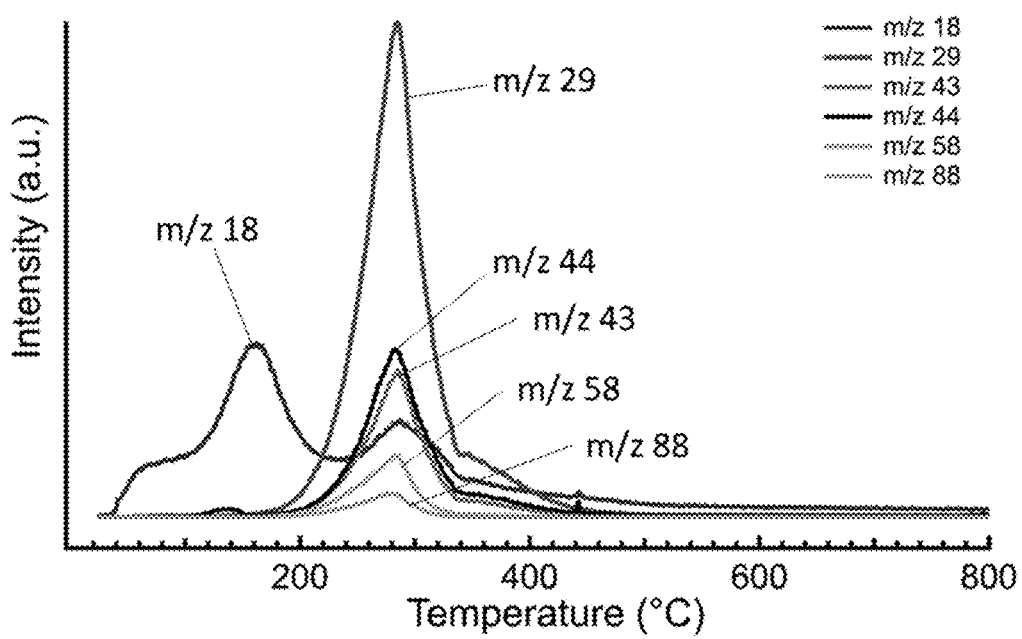
FIG. 5 is a graph of intensity versus temperature, illustrating temperature programmed desorption (TPD) spectra of the species evolved from the soft baked 10% PF127 film associated with surfactant decomposition.

Fourier transform infrared spectroscopy (FTIR) confirmed the presence of the surfactant in the soft baked films. Absorbances at 2968, 2933, and 2872 cm$^{-1}$ were characteristic of both —CH$_3$ and —CH$_2$ found in the surfactant (FIG. 4). The intense peak at 1109 cm$^{-1}$ was due to the ether stretch of the PF127 block copolymer. The stretches centered at 3475 and 1606 cm$^{-1}$ were consistent with the stretching and bending modes of H$_2$O, respectively. Temperature programmed desorption (TPD) showed the majority of the surfactant was removed before 350° C., with some residual mass being lost at slightly elevated temperatures (FIG. 5). With respect to FIG. 5, possible species desorbing during the heating process include, but are not limited to, H$_2$O (m/z=18), CH$_3$CH$_2$ (m/z=29), CH$_2$CHO [or other similar species (m/z=43)], CH$_2$CH$_2$O (m/z=44), and (CH$_2$CH$_2$O)$_2$ (m/z=88). From the TPD data, it was determined that a 500° C. anneal would ensure the removal the surfactant. Once annealed at 500° C., stretches consistent with the PF127 were no longer present in the spectrum.

The broad peak with a maximum absorbance at 904 cm$^{-1}$ was consistent with the Al—O phonon. The peaks at 1253 and 1065 cm$^{-1}$ were both modes of the thermally grown SiO$_2$ layer in between the Si substrate and porous alumina film. The spectrum also showed water had resorbed onto the film after annealing, shown by the water bending and stretching modes at 3475 and 1606 cm$^{-1}$, respectively.

Figure 6:
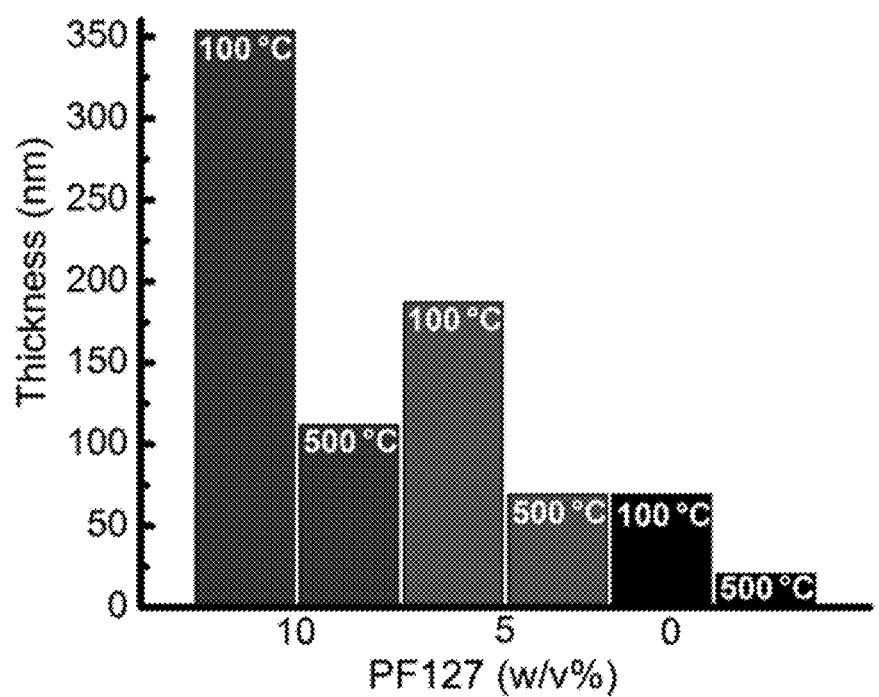
FIG. 6 is a bar graph of thickness versus amount of PF127, illustrating the film thicknesses as a function of the concentration of PF127 after soft baking and annealing at 500° C., with 10% PF127, 5% PF127, and a 0% PF127 control.

To determine the thicknesses and refractive indices of the materials before and after annealing spectroscopic ellipsometry was used. An alumina control film, which was prepared with the same precursor concentration and processing temperatures, was used to compare to the thicknesses and refractive indices of the porous films. The soft baked films with PF127 were much thicker than the alumina control film, again confirming the presence of the surfactant in the films (FIG. 6). After annealing the films at 500° C. for 1 hour to remove the surfactant, there was a large decrease in the overall film thicknesses, as expected. The film with the largest volume change was the 10% PF127 loaded film, shrinking over 68%. The increased thickness of the films with PF127 compared to the control suggested that the process had created pores in the film.

Figure 7:
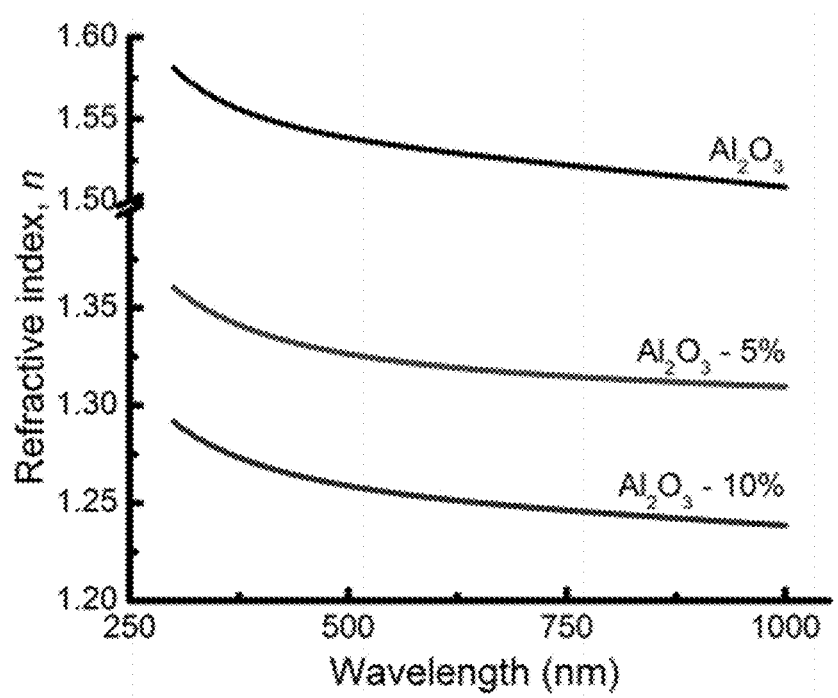
FIG. 7 is a graph of refractive index versus wavelength, illustrating refractive index dispersion curves from 350 nm to 1000 nm for films with different amounts of PF127 after annealing at 500° C., with an amorphous film control ($Al_2O_3$) that was produced from the same alumina precursor without any surfactant.

The differences in the refractive index (n) of the porous films were compared to that of the control to determine directly if the material incorporated pores into its structure, as the refractive index drops with the inclusion of air. Dispersion curves obtained from the ellipsometry data modeled using the Sellmeier equation showed a large decrease in refractive index as the surfactant amount was increased (FIG. 7). Using the refractive index of each film recorded at 550 nm, the control film was observed to have the highest refractive index of n=1.54. The porous films however, had much lower refractive indices, with n=1.32 and 1.26 for the 5% and 10% PF127 films, respectively. The optimal refractive index for an anti-reflective coating for glass is n=1.23. The value reported herein is within 2.5% of the optimal for anti-reflective glass coatings.

To compare the optical properties and porosity of the films, the Lorentz-Lorenz equation was applied $$V = 1 - \frac{(n_p^2 - 1)(n_s^2 + 2)}{(n_p^2 + 2)(n_s^2 - 1)} \qquad \text{Equation 6}$$

With respect to Equation 6, V is the relative film porosity, $n_p$ is the refractive index of the porous material, and $n_s$ is the refractive index of the film framework. Using the experimentally determined refractive index (λ=550 nm) of the control film as $n_s$, the 10% PF127 film showed a porosity of 49% and the 5% PF127 film was calculated to have a porosity of 36%.

To determine the effect of the alumina precursor concentration on film properties, the concentration of the flat-Al$_{13}$ precursor was varied, with 10% w/v of PF127 added in each case. With solutions having concentrations of 0.4 M and 0.1 M, the film thicknesses after annealing at 500° C. for 1 hour reduced from 112 nm to 62 nm and 28 nm, respectively. Interestingly, the indices of refraction were nearly the same as for the film produced from the 0.8 M precursor. Film thicknesses can be directly tuned for the preferred application by simply controlling the concentration of the alumina precursor. A rough approximation of film thickness can be estimated by Equation 7, reproduced below, where t is the thickness (nm) and c is the concentration of $Al^{3+}$ (M).

$$t=[145.8cM^{-1}]\text{ nm} \hspace{2cm} \text{Equation 7}$$

Figure 8:
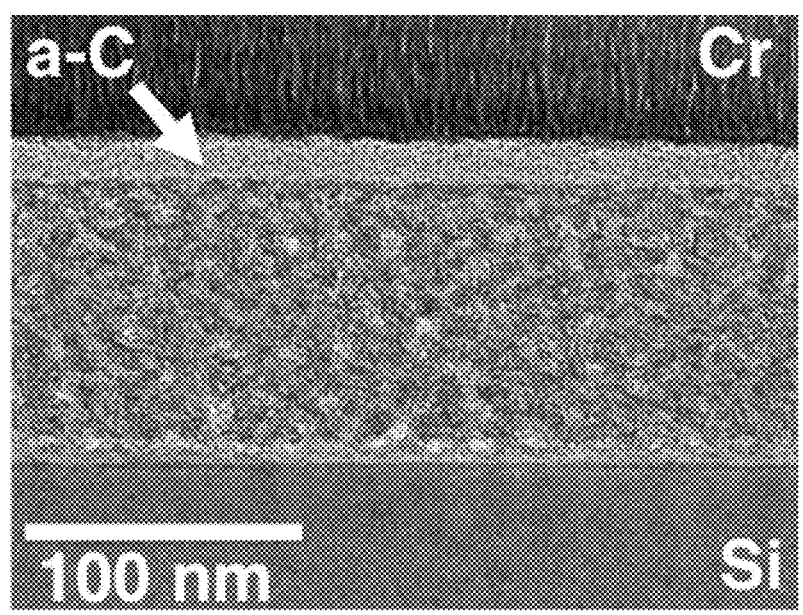
FIG. 8 is a cross-sectional transmission electron microscopy (TEM) micrograph of the 10% PF127-loaded alumina film after annealing at 500° C., illustrating the porous nature of the alumina film with the areas of low density (pores) being lighter.
Figure 9:
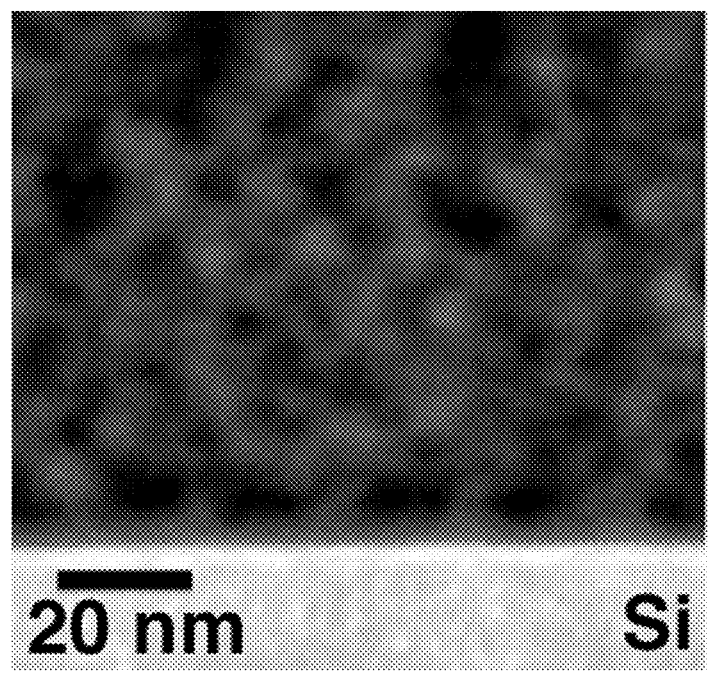
FIG. 9 is a photograph of the cross-sectional TEM micrograph of FIG. 8 at higher magnification in scanning transmission electron microscopy (STEM) mode, illustrating the porous nature of the alumina film with areas of low density (pores) being darker in the STEM mode.

Cross-sectional TEM micrographs confirmed the thickness results for the annealed 10% PF127 alumina film modeled from ellipsometry, with a thickness of 103 nm (FIG. 8). The micrograph collected in STEM mode undoubtedly showed pores (FIG. 9); no obvious ordering of the pores in the material was observable by TEM. The largest pore diameter observed was 10-12 nm, consistent with previously reported results for bulk porous materials made using PF127. A dry sample of precursor was annealed to 500° C. and a Brunauer-Emmett-Teller (BET) measurement was taken of the resultant powder. The BET data were consistent with the TEM and previous reported findings, showing the Barrett-Joyner-Halenda (BJH) pore size was 14 nm. The results from AFM did not show pores on the surface of the film. On the contrary, the AFM showed the surface of the porous film was very smooth, with a root mean square (RMS) value of 0.5 nm (FIG. 1).

Figure 10:
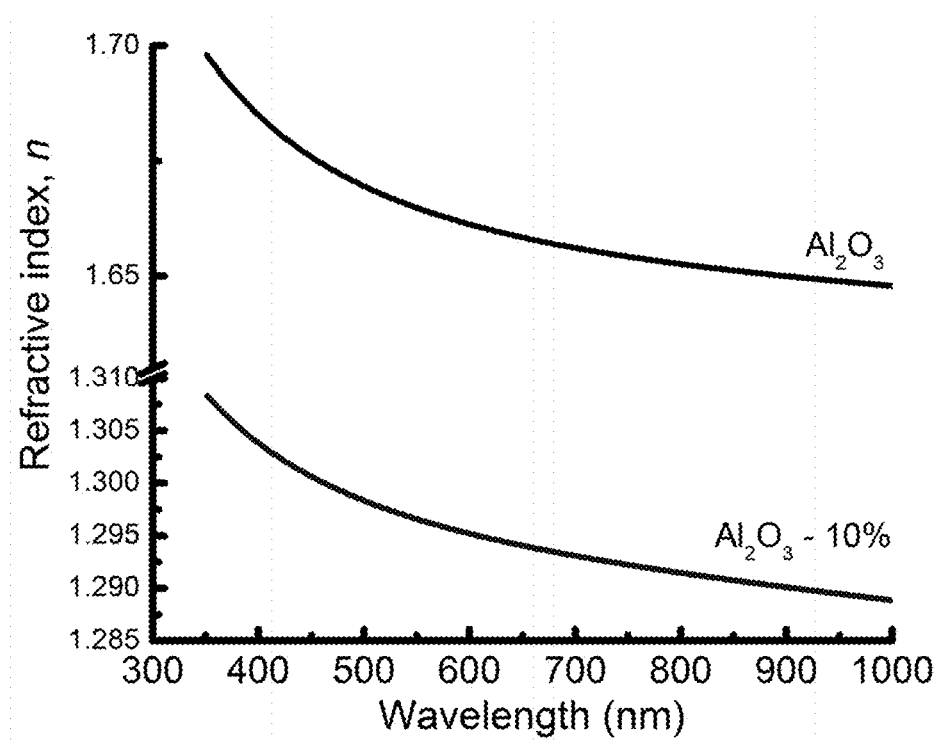
FIG. 10 is a graph of refractive index versus wavelength, illustrating the refractive index dispersion curves from the Sellmeier model spanning 350 nm to 1000 nm for a 10% PF127 film after annealing at 900° C., compared to a control film produced without PF127. The fit of the 900° C. sample gave thickness values of 107 nm for the porous film and 154 nm for the newly formed $SiO_2$, and thus agreed with the TEM data. The 1000° C. fit showed a film thickness of 40 nm, suggesting that the porous structure had collapsed.
Figure 11:
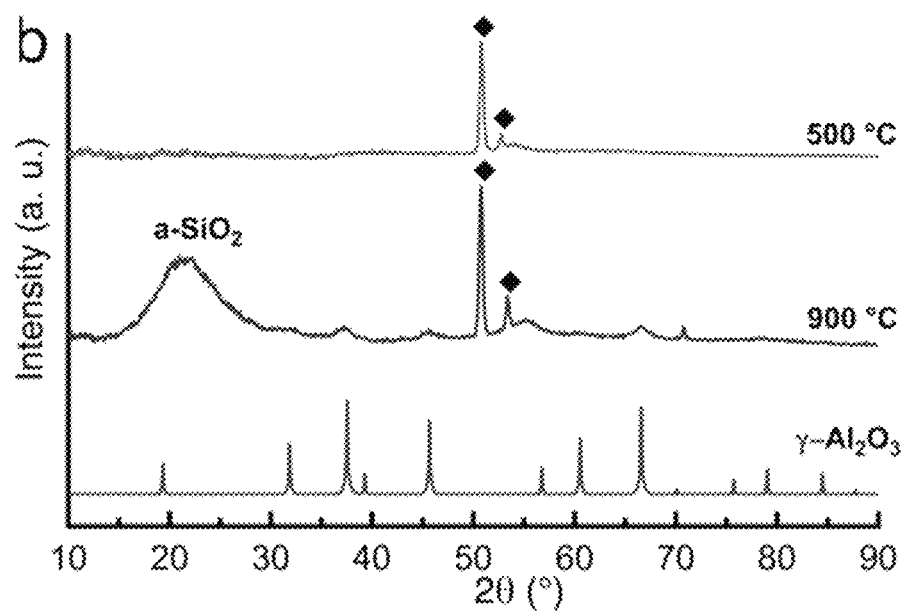
FIG. 11 is a graph of intensity versus 2θ, illustrating the X-ray diffraction (XRD) patterns for samples annealed at 500° C. and 900 C, showing the formation of broad peaks consistent with γ-$Al_2O_3$ (provided for comparison), and also showing that $SiO_2$ formed upon annealing and was present as an amorphous halo in the diffraction pattern centered at about 22° (silicon substrate peaks are indicated with a diamond (♦)).
Figure 12:
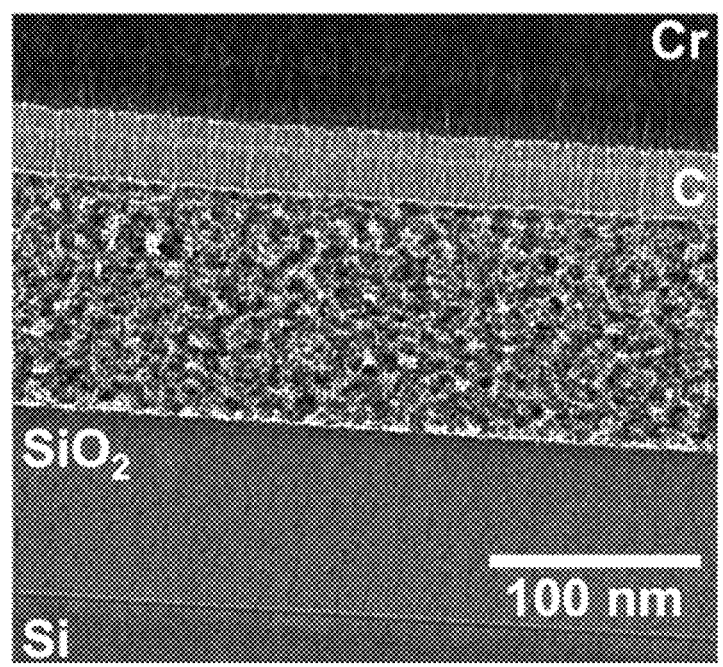
FIG. 12 is a cross-sectional TEM micrograph of a 10% PF127 film annealed at 900° C., illustrating that the porous nature of the film remained after higher thermal treatment.

Thermal stability of porous thin films is a concern, as the thin walls of the framework can collapse at elevated temperatures. To test this, a film was prepared from the 10% precursor annealed at 900° C., and was analyzed for thermal stability. The ellipsometry data showed that the film was still largely porous, with the index of refraction increased slightly to n=1.30, compared to the control film which had a value of 1.67 (FIG. 10). This increase in the refractive index was consistent with densification of the films, though there was not a significant difference in refractive index in the film annealed at 500° C. compared to the film annealed at 900° C. As the annealing temperature increased to 1000° C., the refractive index increased to 1.33, possibly indicating the initial collapse of the porous structure (FIG. 10). X-ray diffraction patterns were collected for the porous film at 500 and 900° C. to determine if the porous film was crystalline (FIG. 11). With no peaks other than the substrate peak, the sample annealed at 500° C. appeared to be X-ray amorphous. However, after annealing to 900° C. the film started to crystallize into the $\gamma$-$Al_2O_3$ phase. From ellipsometry data, the film appeared to retain its porous nature until 1000° C., where the crystallization process destroyed the porosity of the sample. FIGS. 11 and 12 also show that amorphous $SiO_2$ formed during the annealing process as the surface of the silicon substrate is oxidized.

Example 2

Method for Making a Nanoporous Aluminum Oxide Phosphate Thin Film from Aqueous Precursors A. Materials and Methods An alumina film was prepared as a control from a flat-$Al_{13}$ precursor, using the method previously described in Example 1. Aluminum oxide phosphate (AlPO) precursor solutions were prepared using the method of Meyer et al. (Chem. Mater. 2007, 19 (16), 4023-4029) with phosphate to aluminum concentrations ranging from 0.6:1 to 2:1, respectively. Briefly, $Al(OH)_3$ (Alfa) was dissolved in 2 mole equivalents of aqueous $HNO_3$ (Fisher, ACS 70%) with the appropriate amount of aqueous $H_3PO_4$ (Fisher, ACS 85%). $Al(OH)_3$ dissolution was accomplished by stirring under moderate heat (80-90° C.) in a water bath for 24 hours. Solutions were prepared with an aluminum concentration of 0.4 M in order to determine the effect of phosphate concentration on the properties of the thin films. An 10% w/v loading of PF127 (Aldrich) was used for the solution-processed porous alumina films, as previously described in Example 1. The PF127 was used without further purification and was dissolved directly in the precursor solutions.

Films were spun at 3000 rpm for 30 seconds on highly doped p-Si. Substrates were cleaned and made hydrophilic by an oxygen plasma treatment using a Plasma Etch PE-50. Directly after depositing precursors without surfactant, films were soft baked at 230° C. for 1 minute and then annealed in a Neytech Qex furnace. The porous films were initially soft baked at 100° C. for 1 minute, followed by another 1 minute soft bake at 200° C. All films were annealed to 500° C. with a ramp rate of 20° C./minute to densify the nonporous films and remove the incorporated surfactant in the porous films.

Spectroscopic ellipsometry measurements were collected on a J. A. Woollam M-2000 instrument to determine the film thicknesses, which were modeled using the CompleteEASE software package. The Sellmeier model was employed to determine the thicknesses and optical constants of the soft baked and annealed thin films. Refractive indices of the bulk and porous films annealed at 500° C. were directly compared.

Cross-sectional SEM images were collected on an FEI Helios NanoLab 650 high resolution SEM. A topcoat of carbon was sputtered to provide a conductive layer to reduce the effects of charging on the image. XRD spectra were collected on a Rigaku Ultima IV multipurpose X-ray diffraction system, with Cu K$\alpha$ radiation. AFM measurements were carried out using an Asylum Research MFP-3D atomic force microscope and images were acquired over 1×1 μm² areas.

B. Results and Discussion

The aqueous AlPO precursors of the present disclosure were prepared in a fashion similar to that of Meyer, but with the amount of $H_3PO_4$ that was added to the slurry being varied to achieve a desired aluminum to phosphate concentration. The solutions were heated at 90° C. in capped media jars with magnetic stirring for 24 hours, in order to fully dissolve the $Al(OH)_3$. Solutions were prepared with a constant concentration of $Al^{3+}$ (0.4 M), allowing for a direct comparison of the effect of $PO_4^{3-}$ on the optical and physical properties of the spun-coat thin films.

Figure 13:
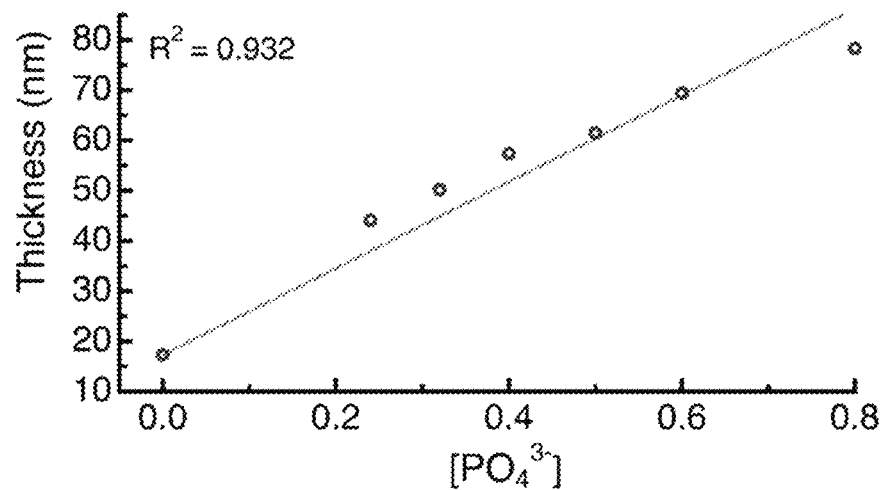
FIG. 13 is a graph of thickness versus phosphate concentration, illustrating the linear relationship between thickness (nm) and $PO_4^{3-}$ concentration for films made using precursors with 0.4 M $Al^{3+}$.

After spin coating, the thin films were annealed to 500° C. to ensure the removal of any residual nitrates. As $PO_4^{3-}$ was added, a linear increase in thickness was observed (FIG. 13) that can be described by Equation 8, where t is the thickness (nm) and c is the concentration of $PO_4^{3-}$ (M).

$$t=[86.1cM^{-1}+17.3]\text{ nm} \hspace{2cm} \text{Equation 8}$$

Figure 14:
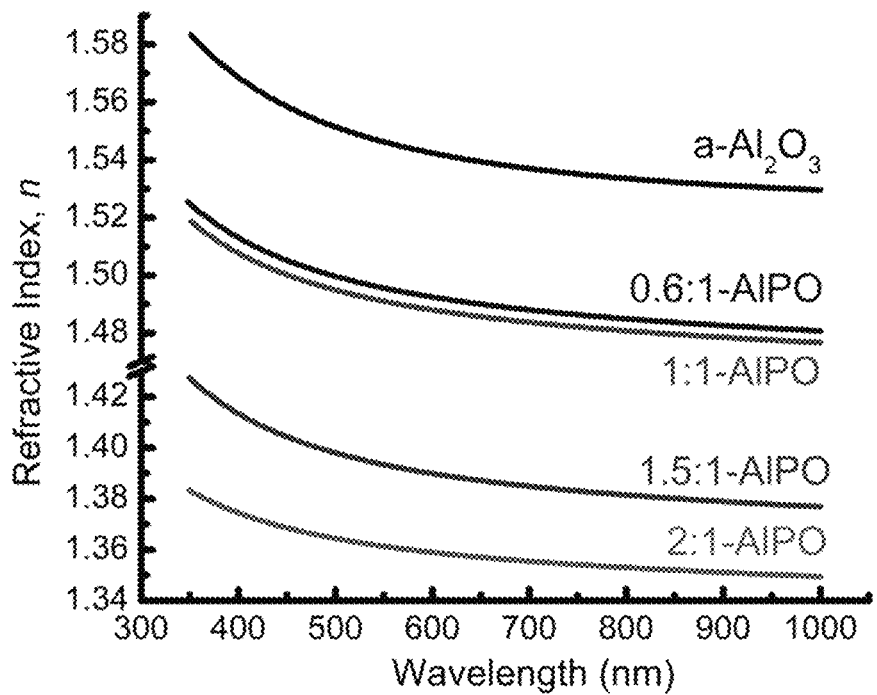
FIG. 14 is a graph of refractive index versus wavelength, illustrating the optical dispersion curves modeled using the Sellmeier equation of an aluminum phosphorus oxide (AlPO) film with varied amounts of $PO_4^{3-}$ and an amorphous alumina (a-$Al_2O_3$) control film after annealing at 500° C.

The y-intercept is nonzero, as the amorphous alumina (a-$Al_2O_3$) film from the 0.4 M precursor produced a film with a thickness of 17.3 nm. The incorporation of $PO_4^{3-}$ into the film significantly reduced the refractive indices of alumina thin films, as evidenced by the optical dispersion curves (FIG. 14). Solution-processed amorphous alumina has a refractive index (n) of 1.55 at 550 nm, whereas the AlPO film with the highest amount of phosphate (2P:1Al) exhibited a remarkably low value of 1.36 at 550 nm. Comparatively, the lowest refractive index material amongst all dense inorganic solids is $MgF_2$ with an n=1.37 at 550 nm.

Figure 15:
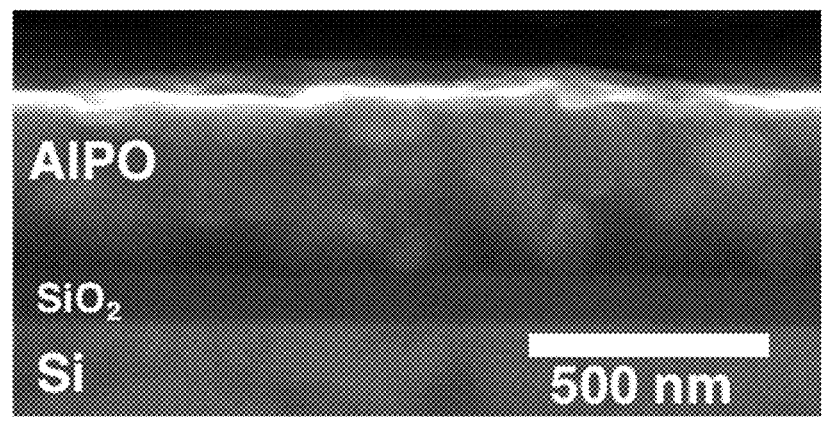
FIG. 15 is a scanning electron microscopy (SEM) micrograph of the 2P:1Al thin film (5 coats), illustrating the crystalline grain growth.

However, a scanning electron micrograph of an AlPO thin-film cross-section showed that the thin film had apparent grains (FIG. 15). Grain growth may facilitate the formation of nanopores in the film further lowering the overall index of refraction, though pores are not obvious from the micrograph. When precursors with higher phosphate to aluminum content than 2:1 were used, the films were not continuous after annealing at 500° C.

Figure 16:
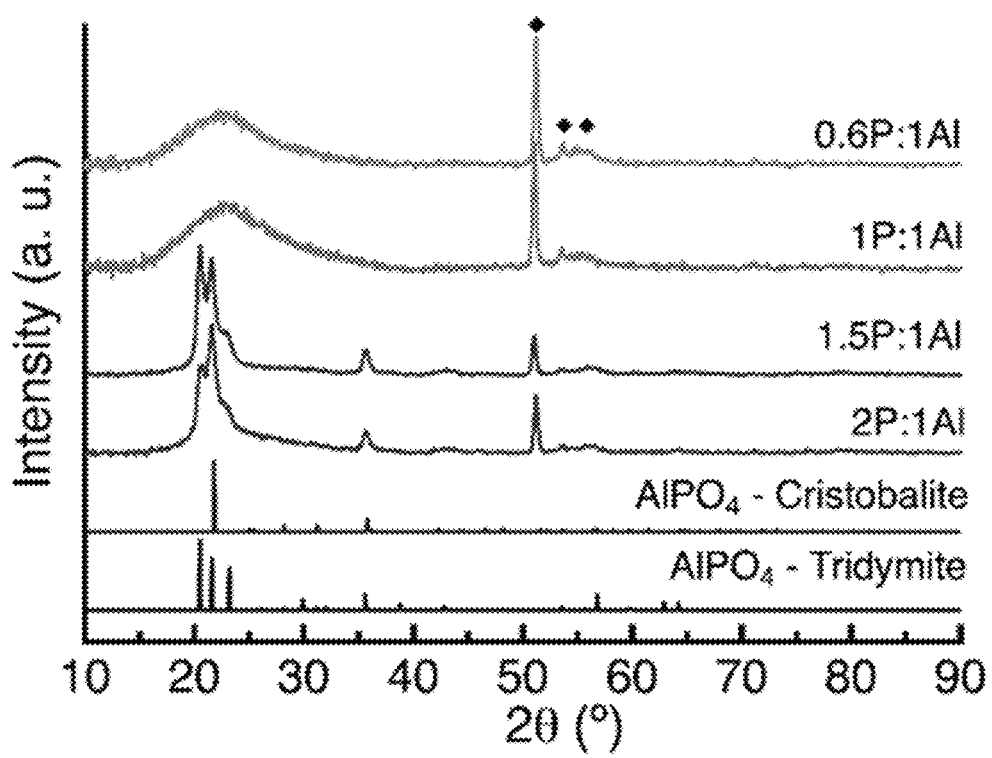
FIG. 16 is a graph of intensity versus 2θ, illustrating the XRD patterns for AlPO thin films with different P:Al annealed at 500° C. (♦ denotes peaks from the Si substrate).
Figure 17:
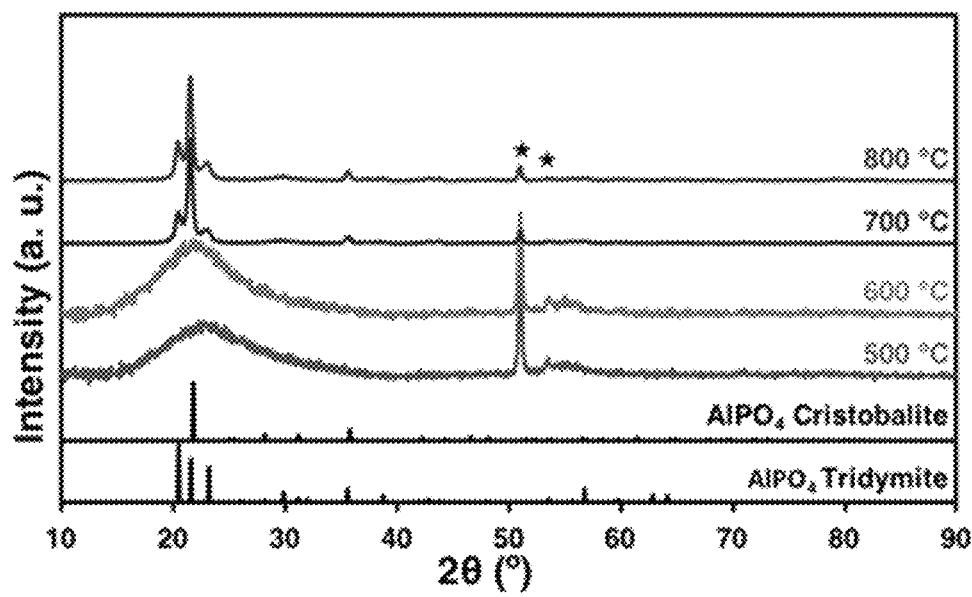
FIG. 17 is a graph of of intensity versus 2θ, illustrating the XRD data of an 1P:1Al thin film, showing crystallinity onset between 600 and 700° C. (★ denotes peaks from the substrate).

Grazing incidence X-ray diffraction (GIXRD) data were collected to determine the effect of phosphate concentration on the crystallization temperature of the AlPO thin films. As the $PO_4^{3-}$ content was increased, the crystallization temperature decreased. FIG. 16 shows films with higher ratio of $PO_4^{3-}$ to $Al^{3+}$ than 1:1 were crystalline by 500° C., crystallizing in both the tridymite and cristobalite phases. Interestingly, a relationship was observed between the precursor phosphate content and the ratio of the two crystalline phases produced in films annealed at 500° C. The 2P:1Al sample favored the cristobalite phase and the 1.5P:1Al sample favored the tridymite phase. The 0.6P:1Al films were X-ray amorphous until over 1100° C., while the 1P:1Al sample crystallized between 600 and 700° C. (FIG. 17).

Figure 18:
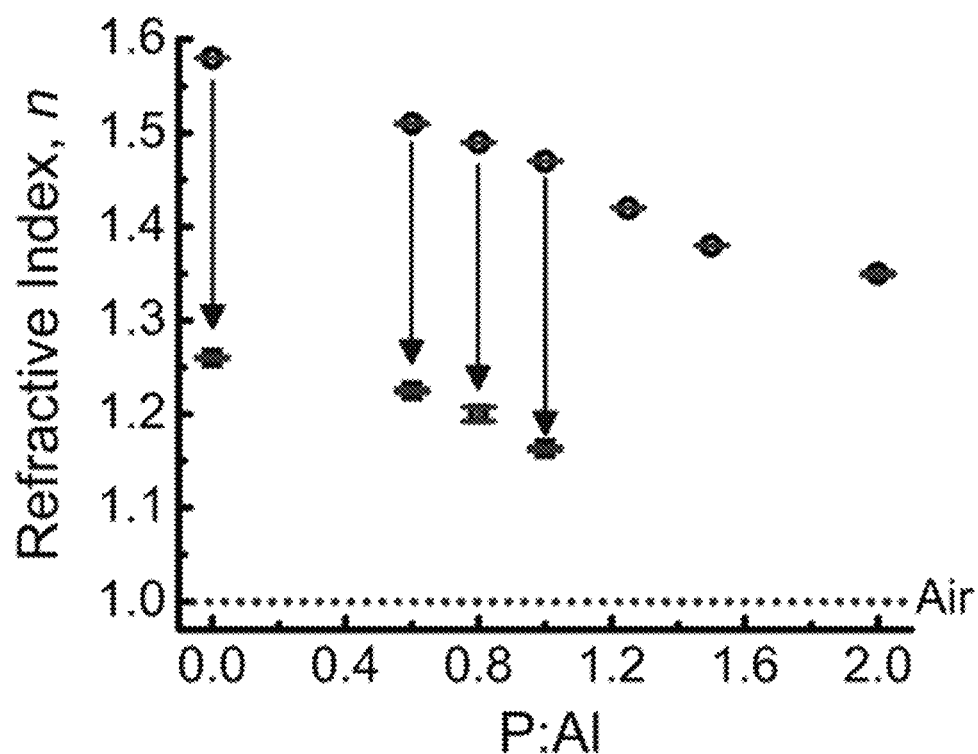
FIG. 18 is a graph of refractive index versus P:Al ratio, illustrating the refractive indices at 550 nm of dense AlPO thin films with varied P content (circles) and the corresponding refractive indices of porous films with the same chemical makeup (squares).

Another way to lower the refractive index of materials is to incorporate pores, as shown in Example 1, as air has the lowest refractive index (n=1). Accordingly, porosity was introduced using a surfactant, in this case PF127, as the porogen. PF127 (10% w/v) was dissolved in the solutions with varied phosphate to aluminum content. FIG. 18 illustrates the effect of porosity on the refractive indices of thin films annealed at 500° C. There was a clear linear trend between the refractive index at 550 nm and phosphate content, with the induced porosity significantly reducing the refractive indices.

Interestingly, porous films with P:Al above unity (i.e., with P:Al greater than 1:1) were found to be unstable upon heating, as SEM showed the films were no longer continuous (FIGS. 2 and 3). Without being bound to a particular theory, the pores may have collapsed due to the low crystallization temperature of the precursors with higher P:Al. The porous film with equal parts $PO_4^{3-}$ and $Al^{3+}$ (a P:Al ratio of 1:1 or unity), however, exhibited a remarkably low index of refraction, reaching a value as low as n=1.16. Similar to the porous alumina films made by the method described in Example 1, the porous AlPO films that were annealed at 500° C. were remarkably smooth by AFM, with RMS roughness values of <0.6 nm.

Figure 19:
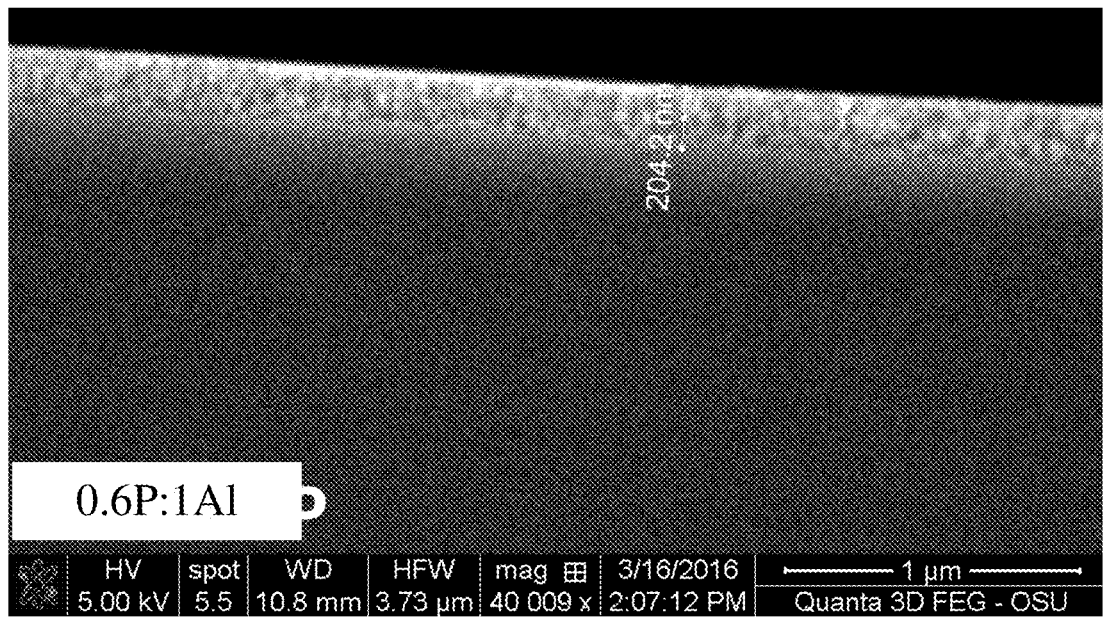
FIG. 19 is a cross sectional SEM of a 0.6P:1Al film after annealing to 500° C. showing the ellipsometry data that establishes a layer thickness of 204.2 nm.
Figure 20:
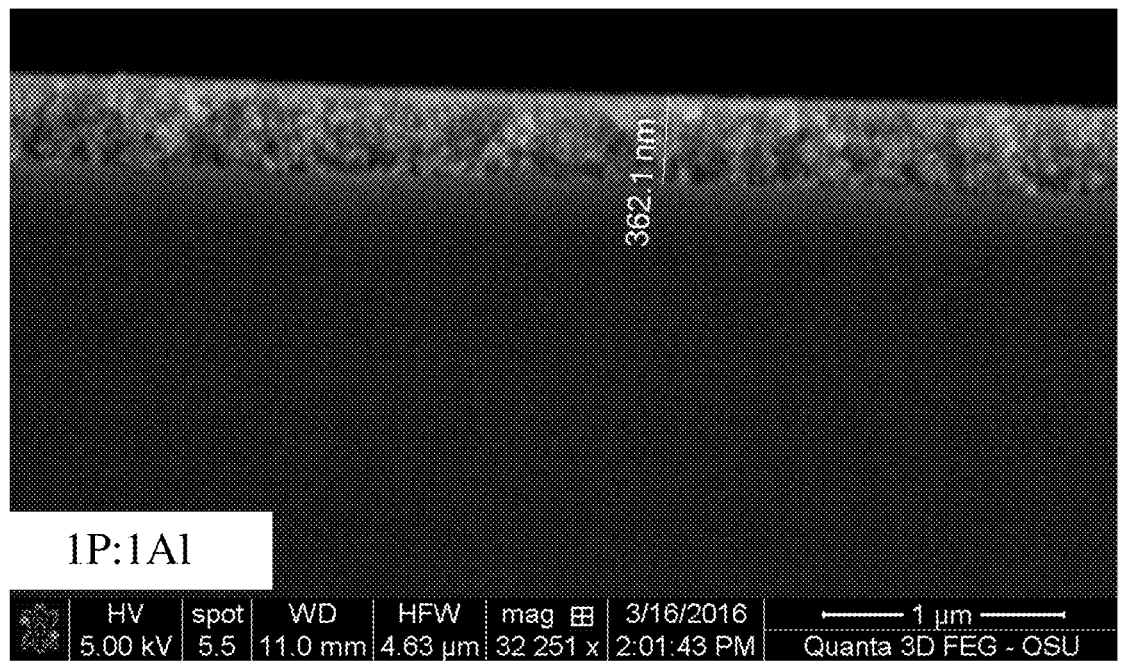
FIG. 20 is a cross sectional SEM of a 1P:1Al film after annealing to 500° C. showing the ellipsometry data that establishes a layer thickness of 362.1 nm.
Figure 21:
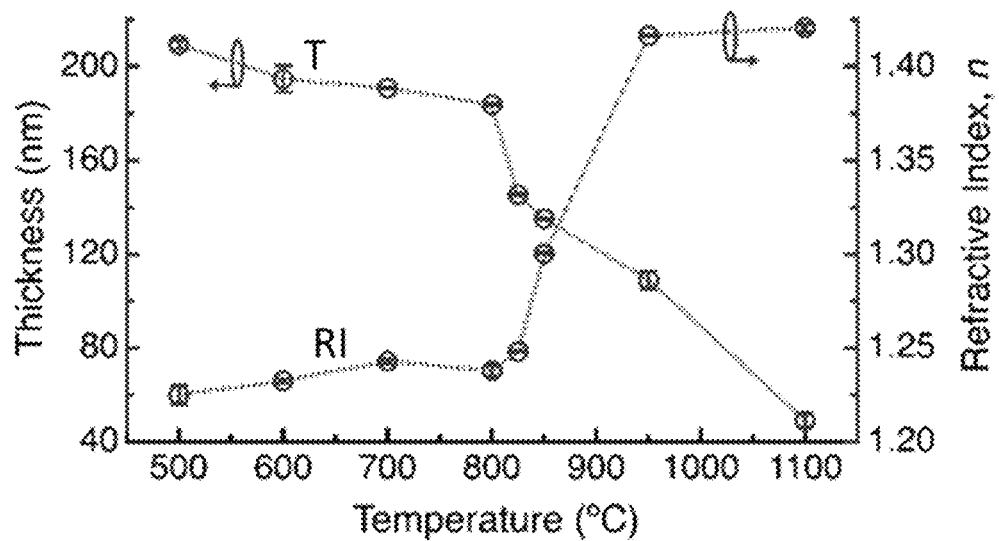
FIG. 21 is a graph of thickness and refractive index versus temperature, illustrating thickness (T) and refractive index (RI) of a porous AlPO film having a ratio of 0.6P:1Al.
Figure 22:
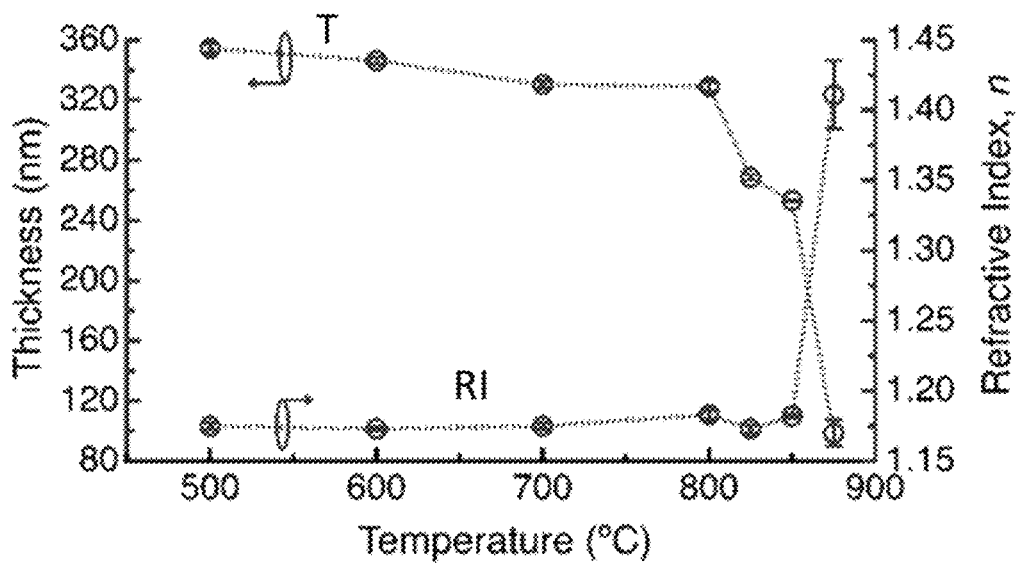
FIG. 22 is a graph of thickness and refractive index versus temperature, illustrating the thickness (T) and refractive index (RI) of a porous AlPO film having a ratio of 1P:1Al.

To assess the thermal stability of the porous materials, the thickness and refractive indices of the films were tracked with respect to annealing temperatures using the 0.6P:1Al and 1P:1Al porous films (cross sections of exemplary embodiments are provided in FIGS. 19 and 20). The pores of films made with 0.6P:1Al and 1P:1Al appeared to start to collapse at 825 and 875° C., respectively (FIGS. 21 and 22). The sample made using the 0.6P:1Al precursor had a sample thickness of 209 nm after annealing at 500° C. The film slowly densified with annealing until the pores started collapsing at 825° C. The refractive index reflected this trend, as it slowly increased until the onset of pore collapse, as illustrated in FIG. 21. A similar trend was observed in the film made using the 1P:1Al precursor, albeit a much thicker film (FIG. 22). The initial film thickness was 354 nm, shrinking to 98 nm after the pores collapsed above 850° C. The remarkably low refractive index of the film was retained upon heating at 850° C., but then rose sharply after annealing at 875° C. At 850° C., the film had a refractive index of 1.18, an increase of less than 2% from the sample annealed at 500° C., which had an n value of 1.16, whereas at 875° C., the film had a refractive index of about 1.4 (FIG. 22).

Figure 23:
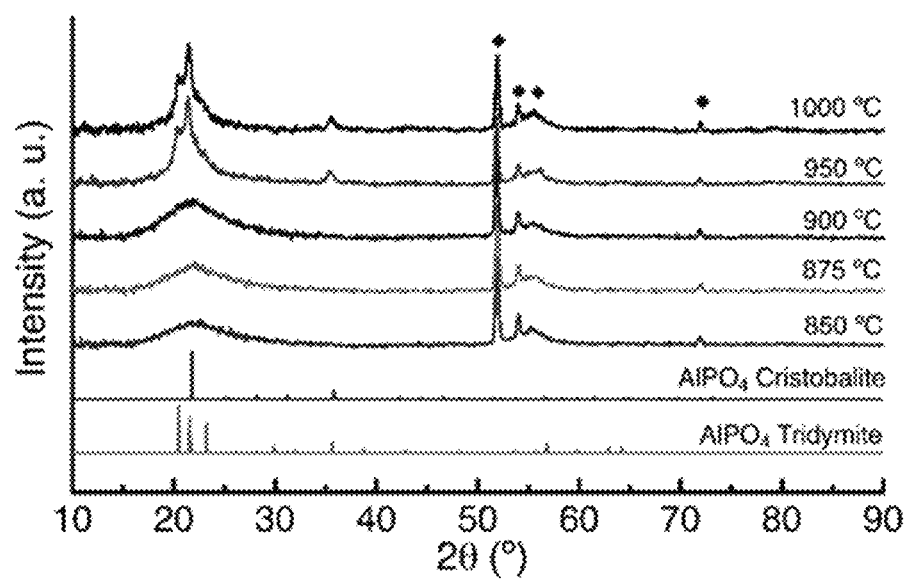
FIG. 23 is a graph of intensity versus 2θ, illustrating the XRD of a porous AlPO film with 0.6P:1Al as a function of temperature (♦ denotes peaks from the Si substrate).
Figure 24:
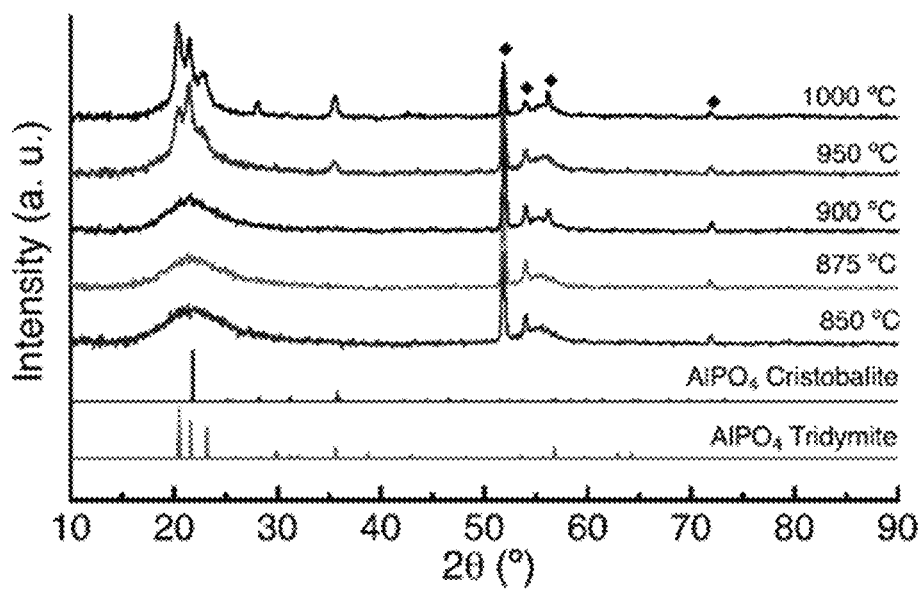
FIG. 24 is a graph of intensity versus 2θ, illustrating the XRD of a porous AlPO film with 1P:1Al as a function of temperature (♦ denotes peaks from the Si substrate).
Figure 25:
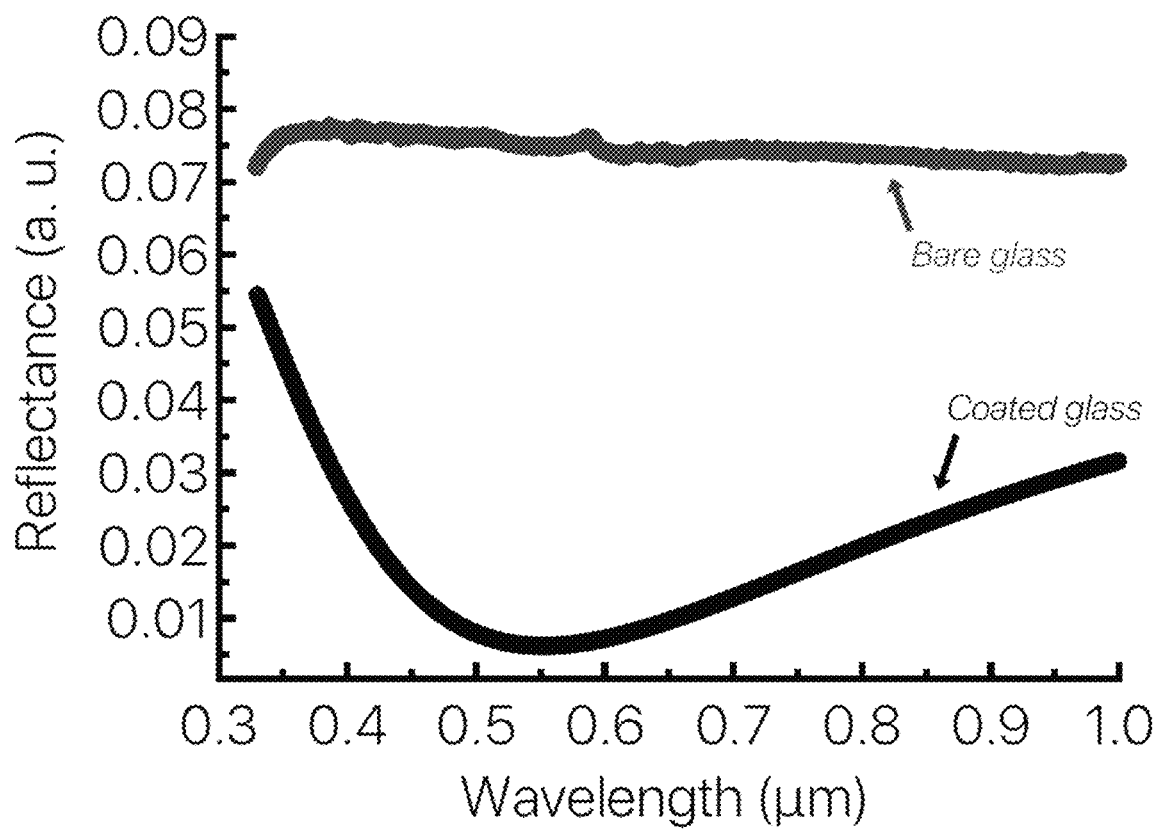
FIG. 25 is a graph of reflectance versus wavelength, illustrating a reflection of less than 0.5% for a borosilicate glass substrate coated with a quarter wave-thick porous AlPO film with 1P:1Al on both surfaces, and providing a comparision with uncoated borosilicate glass, which has a reflectance of about 8%.

X-ray diffraction data on the porous films annealed at various temperatures were collected to determine the phase transition temperature (FIGS. 23 and 24). Crystallization of the porous films occurred between 900 and 950° C., independent of the phosphate concentration. In fact, crystallization occurred well after the pores collapsed in both cases. Similar to the non-porous films, phosphate content affected the crystalline phase produced upon annealing. And at higher temperatures, the tridymite phase was favored over the cristobalite phase in the film with the increased amount of $PO_4^{3-}$.

Disclosed herein is a facile approach to tune the refractive index of AlPO thin films, using both porosity and phosphate content. The stability of the thin films was contingent on the phosphate content. Precursors with phosphate:aluminum ratios above 2:1, respectively, did not make continuous thin films, and porous films above 1P:1Al were not thermally stable. The disclosed approach enables the production of nanoporous films using a low-energy route that provides films with refractive indices as low as 1.16, and that are stable up to 825° C. The exceptional smoothness of the amorphous, dense and porous films allows laminate materials to be prepared for graded anti-reflective coatings by simply spin coating.

IV. Exemplary Embodiments

The following numbered paragraphs illustrate exemplary embodiments of the disclosed technology.

Paragraph 1. A porous aluminum oxide film comprising a surface having a root mean square roughness value of from greater than zero to 1 nm.

Paragraph 2. The film of paragraph 1, wherein the root mean square roughness value is from 0.1 nm to 0.7 nm.

Paragraph 3. The film of paragraph 1 or paragraph 2, wherein the root mean square roughness value is from 0.3 nm to 0.6 nm.

Paragraph 4. The film of any one of paragraphs 1-3, wherein the root mean square roughness value is from 0.4 nm to 0.5 nm.

Paragraph 5. The film of any one of paragraphs 1-4, wherein the film has a refractive index of from 1 to 2.

Paragraph 6. The film of paragraph 5, wherein the refractive index is from 1 to 1.35.

Paragraph 7. The film of paragraph 5, wherein the refractive index is from 1 to 1.2.

Paragraph 8. The film of any one of paragraphs 1-7, wherein the film has a thickness of from greater than zero to 500 nm.

Paragraph 9. The film of paragraph 8, wherein the thickness is from greater than zero to 250 nm.

Paragraph 10. The film of paragraph 8, wherein the thickness is from greater than zero to 100 nm.

Paragraph 11. The film of any one of paragraphs 1-10, wherein the film comprises pores having an average diameter of from greater than zero to 20 nm.

Paragraph 12. The film of any one of paragraphs 1-11, wherein the film further comprises phosphorus.

Paragraph 13. The film of any one of paragraphs 1-12, wherein the film comprises a P:Al ratio of from greater than zero:1 to 3:1.

Paragraph 14. The film of paragraph 13, wherein the P:Al ratio is from greater than zero:1 to 2:1.

Paragraph 15. The film of paragraph 13, wherein the P:Al ratio is from 0.4:1 to 1.8:1.

Paragraph 16. The film of paragraph 13, wherein the P:Al ratio is from 0.4:1 to 1:1.

Paragraph 17. The film of paragraph 16, wherein the P:Al ratio is 0.6:1 or 1:1. Paragraph 18. The film of any one of paragraphs 1-17, wherein the film has a general formula $Al_2O_{3-b}P_2O_5$, where b is from 0.25 to 2.

Paragraph 19. The film of any one of paragraphs 1-18, wherein the film is a layered film.

Paragraph 20. The film of paragraph 19, wherein the layered film comprises from 2 to 10 layers.

Paragraph 21. The film of any one of paragraphs 19-20, wherein each layer independently has a refractive index of from 1 to 1.5.

Paragraph 22. The film of any one of paragraphs 19-21, wherein the layered film comprises from 3 to 10 layers.

Paragraph 23. The film of any one of paragraphs 19-22, wherein the layered film comprises a composition gradient from a first composition to a second composition.

Paragraph 24. The film of paragraph 23, wherein the second composition comprises a greater P:Al ratio than a P:Al ratio of the first composition.

Paragraph 25. The film of any one of paragraphs 19-24, wherein the layered film comprises one or more layers having a first refractive index and one or more layers comprising a second refractive index greater than the first refractive index.

Paragraph 26. The film of paragraph 25, wherein the layered film comprise a refractive index gradient from the first refractive index to the second refractive index.

Paragraph 27. The film of paragraph 1, comprising phosphorus and having an P:Al ratio is from 0.4:1 to 1:1, wherein the root mean square roughness value is from 0.4 nm to 0.5 nm, and the film has a refractive index of from 1 to 1.35.

Paragraph 28. The film of paragraph 1, wherein the film is a layered film comprising from 2 to 10 layers, each layer comprising phosphorus and having an P:Al ratio of from 0.4:1 to 1:1 and a refractive index of from 1 to 1.35, the layered film comprising:

a composition gradient from a first composition to a second composition wherein the second composition comprises a greater P:Al ratio than a P:Al ratio of the first composition; and one or more layers having a first refractive index and one or more layers comprising a second refractive index greater than the first refractive index.

Paragraph 29. A coated lens comprising a glass lens having a porous aluminum oxide film comprising a surface having a root mean square roughness value of from greater than zero to 1 nm.

Paragraph 30. The coated lens of paragraph 29, wherein the porous aluminum oxide film further comprises phosphorus.

Paragraph 31. A method for making the porous aluminum oxide thin film of any one of paragraphs 1-28, comprising forming a first aqueous solution comprising a first alumina precursor, and a first surfactant;

depositing the first aqueous solution on a substrate to form a first film; and exposing the substrate to an annealing temperature to form the porous aluminum oxide thin film.

Paragraph 32. The method of paragraph 31, wherein the first alumina precursor is selected from aluminum nitrate, aluminum chloride, $Al_{13}(OH)_{24}(NO_3)_{15}$, or a combination thereof.

Paragraph 33. The method of paragraph 31 or paragraph 32, wherein the first alumina precursor is $Al_{13}(OH)_{24}(NO_3)_{15}$.

Paragraph 34. The method of any one of paragraphs 31-33, wherein the first surfactant is a nonionic surfactant.

Paragraph 35. The method of paragraph 34, wherein the nonionic surfactant is a block copolymer.

Paragraph 36. The method of paragraph 35, wherein the block copolymer comprises alkylene oxide blocks.

Paragraph 37. The method of paragraph 35, wherein the block copolymer comprises ethylene oxide and propylene oxide copolymers.

Paragraph 38. The method of any one of paragraphs 35-37, wherein the block copolymer has a formula

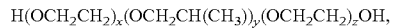

$H(OCH_2CH_2)_x(OCH_2CH(CH_3))_y(OCH_2CH_2)_zOH$, wherein x and z independently are from 10 to 150, and y is from 10 to 100.

Paragraph 39. The method of paragraph 38, wherein x and z are the same and are from 12 to 141, and y is from 10 to 56.

Paragraph 40. The method of paragraph 39, wherein x and z are each 101, and y is 56.

Paragraph 41. The method of any one of paragraphs 31-40, wherein the substrate is or comprises silicon, glass, metal, an optical crystal, a laser crystal, or ceramic.

Paragraph 42. The method of any one of paragraphs 31-41, wherein the substrate is or comprises glass.

Paragraph 43. The method of any one of paragraphs 31-42, wherein depositing the first solution on the substrate comprises depositing the first solution by spin-coating, spray coating, ink-jet printing, mist deposition, dye-slot coating, or dip coating.

Paragraph 44. The method of paragraph 43, wherein the first solution is deposited by spin-coating.

Paragraph 45. The method of any one of paragraphs 31-45, wherein the annealing temperature is from 350° C. to 1,000° C.

Paragraph 46. The method of paragraph 45, wherein the annealing temperature is from 450° C. to 600° C.

Paragraph 47. The method of any one of paragraphs 31-46, further comprising heating the first film at a first temperature of from 50° C. to 250° C. prior to heating the substrate at the annealing temperature.

Paragraph 48. The method of paragraph 47, wherein the first film is exposed to the first temperature for from greater than zero to 5 minutes.

Paragraph 49. The method of any one of paragraphs 31-48, further comprising selecting a concentration of the first alumina precursor to produce a porous thin film having a desired thickness after annealing.

Paragraph 50. The method of paragraph 49, wherein the concentration of the first alumina precursor is from greater than zero to 1M.

Paragraph 51. The method of any one of paragraphs 31-50, wherein an amount of the surfactant is from greater than zero to 20% w/v.

Paragraph 52. The method of any one of paragraphs 31-51, wherein the first aqueous solution comprises the first alumina precursor, the first surfactant, and a first phosphorus-containing precursor.

Paragraph 53. The method of paragraph 52, wherein the first phosphorus-containing precursor is $H_3PO_4$.

Paragraph 54. The method of any one of paragraphs 52-53, wherein an amount of the first phosphorus-containing precursor is selected to produce a desired P:Al ratio in the porous aluminum oxide thin film.

Paragraph 55. The method of paragraph 54, wherein the P:Al ratio is from greater than zero:1 to 2:1.

Paragraph 56. The method of paragraph 54, wherein the P:Al ratio is from 0.5:1 to 1.5:1.

Paragraph 57. The method of paragraph 56, wherein the P:Al ratio is 1:1 or 0.6:1.

Paragraph 58. The method of any one of paragraphs 52-57, further comprising depositing a second aqueous solution comprising a second alumina precursor, a second surfactant, and optionally a second phosphorus-containing precursor, on the first film prior to heating the substrate at the annealing temperature, to make a thin film comprising a first layer and a second layer.

Paragraph 59. The method of paragraph 58, comprising selecting a P:Al ratio for the second layer that is different to a P:Al ratio of the first layer.

Paragraph 60. The method of paragraph 58 or paragraph 59, further comprising depositing a third aqueous solution comprising a third alumina precursor, a third surfactant, and optionally a third phosphorus-containing precursor, on the second layer prior to heating the substrate at the annealing temperature, to make a third layer, the third layer having a different P:Al ratio to that of the second layer.

Paragraph 61. The method of paragraph 60, comprising selecting the P:Al ratios of the first, second and third layers to form a compositional gradient across the layers.

Paragraph 62. The method of paragraph 60 or paragraph 61, comprising selecting the P:Al ratios of the first, second and third layers to form a refractive index gradient across the layers.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A substrate with a porous aluminum oxide film disposed thereon, comprising:
   the substrate; and
   the porous aluminum oxide film, comprising a surface having a root mean square roughness value of from greater than zero to 1 nm and an index of refraction of from 1 to less than 1.5 at 550 nm.

2. The substrate of claim 1, wherein the film has a reflection value of from greater than zero to 6%.

3. The substrate of claim 1, wherein the film has a thickness of from greater than zero to 500 nm.

4. The substrate of claim 1, wherein the film comprises pores having an average diameter of from greater than zero to 20 nm.

5. The substrate of claim 1, wherein the film further comprises phosphorus.

6. A substrate with a porous aluminum oxide film disposed thereon, comprising:
   the substrate; and
   the porous aluminum oxide film, comprising a surface having a root mean square roughness value of from greater than zero to 1 nm, and wherein the film comprises a P:Al ratio of from greater than zero:1 to 3:1.

7. The substrate of claim 6, wherein the film has a general formula $Al_2O_{3-b}P_2O_5$, where b is from 0.25 to 2.

8. The substrate of claim 6, wherein the film is a layered film.

9. The substrate of claim 8, wherein the layered film comprises from 2 to 10 layers.

10. The substrate of claim 9, wherein each layer independently has a refractive index of from 1 to less than 1.5.

11. The substrate of claim 9, wherein the layered film comprises a composition gradient from a first composition having a first P:Al ratio to a second composition having a second P:Al ratio greater than the first P:Al ratio.

12. The substrate of claim 9, wherein the layered film comprises one or more layers having a first refractive index and one or more layers having a second refractive index greater than the first refractive index.

13. The substrate of claim 12, wherein the layered film comprises a refractive index gradient from the first refractive index to the second refractive index.

14. The substrate of claim 6, further comprising phosphorus and having an P:Al ratio is from 0.4:1 to 1:1, wherein the root mean square roughness value is from 0.4 nm to 0.5 nm, and the film has a refractive index of from 1 to 1.35.

15. The substrate of claim 6, wherein the film is a layered film comprising from 2 to 10 layers, each layer comprising phosphorus and having an P:Al ratio of from 0.4:1 to 1:1 and a refractive index of from 1 to 1.35, the layered film comprising:
   a composition gradient from a first composition to a second composition wherein the second composition comprises a greater P:Al ratio than a P:Al ratio of the first composition; and
   one or more layers having a first refractive index and one or more layers comprising a second refractive index greater than the first refractive index.

16. The substrate of claim 1, wherein the substrate is a glass lens having the porous aluminum oxide film disposed thereon to form a coated lens.

17. A method, comprising
   forming a first aqueous solution comprising a first alumina precursor and a first surfactant;
   depositing the first aqueous solution on a substrate to form a first film; and
   exposing the substrate to an annealing temperature to form a porous aluminum oxide thin film having a root mean square roughness value of from greater than zero to 1 nm.

18. The method of claim 17, wherein:
   the first alumina precursor is selected from aluminum nitrate, aluminum chloride, $Al_{13}(OH)_{24}(NO_3)_{15}$, or a combination thereof;
   the first surfactant is a block copolymer; or
   a combination thereof.

19. The method of claim 17, wherein the first aqueous solution further comprises a first phosphorus-containing precursor, and the method further comprises depositing a second aqueous solution comprising a second alumina precursor, a second surfactant, and a second phosphorus-containing precursor, on the first film prior to heating the substrate at the annealing temperature, to make a thin film comprising a first layer and a second layer, the second solution comprising an amount of the second phosphorus-containing precursor selected to provide a P:Al ratio for the second layer that is different from a P:Al ratio of the first layer.

* * * * *